(12) United States Patent
Fu et al.

(10) Patent No.: US 12,548,234 B2
(45) Date of Patent: Feb. 10, 2026

(54) TECHNIQUES FOR FINE-TUNING A MACHINE LEARNING MODEL TO RECONSTRUCT A THREE-DIMENSIONAL SCENE

(71) Applicant: NVIDIA CORPORATION, Santa Clara, CA (US)

(72) Inventors: Yang Fu, San Diego, CA (US); Sifei Liu, San Diego, CA (US); Jan Kautz, Lexington, MA (US); Xueting Li, Santa Clara, CA (US); Shalini De Mello, San Francisco, CA (US); Amey Kulkarni, San Jose, CA (US); Milind Naphade, Cupertino, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 190 days.

(21) Appl. No.: 18/497,945

(22) Filed: Oct. 30, 2023

(65) Prior Publication Data

US 2024/0169652 A1 May 23, 2024

Related U.S. Application Data

(60) Provisional application No. 63/383,880, filed on Nov. 15, 2022.

(51) Int. Cl.
*G06T 7/40* (2017.01)
*G06T 7/60* (2017.01)
(Continued)

(52) U.S. Cl.
CPC .............. *G06T 15/04* (2013.01); *G06T 7/40* (2013.01); *G06T 7/60* (2013.01); *G06T 15/08* (2013.01);
(Continued)

(58) Field of Classification Search
CPC ........... G06T 15/08; G06T 15/04; G06T 7/60; G06T 7/40; G06T 2207/10024;
(Continued)

(56) References Cited

U.S. PATENT DOCUMENTS

2010/0201682 A1 8/2010 Quan et al.
2010/0238164 A1 9/2010 Steedly et al.
(Continued)

OTHER PUBLICATIONS

Zhang et al., "NERF++: Analyzing and Improving Neural Radiance Fields", arXiv:2010.07492, Oct. 21, 2020, pp. 1-9.
(Continued)

*Primary Examiner* — Phi Hoang
(74) *Attorney, Agent, or Firm* — Artegis Law Group, LLP

(57) ABSTRACT

In various embodiments, a scene reconstruction model generates three-dimensional (3D) representations of scenes. The scene reconstruction model computes a first 3D feature grid based on a set of red, blue, green, and depth (RGBD) images associated with a first scene. The scene reconstruction model maps the first 3D feature grid to a first 3D representation of the first scene. The scene reconstruction model computes a first reconstruction loss based on the first 3D representation and the set of RGBD images. The scene reconstruction model modifies at least one of the first 3D feature grid, a first pre-trained geometry decoder, or a first pre-trained texture decoder based on the first reconstruction loss to generate a second 3D representation of the first scene.

20 Claims, 9 Drawing Sheets

(51) Int. Cl.
   *G06T 15/04* (2011.01)
   *G06T 15/08* (2011.01)
   *G06T 15/10* (2011.01)
(52) U.S. Cl.
   CPC .... *G06T 15/10* (2013.01); *G06T 2207/10024* (2013.01); *G06T 2207/10028* (2013.01); *G06T 2207/20081* (2013.01); *G06T 2207/20084* (2013.01)
(58) Field of Classification Search
   CPC ........... G06T 15/10; G06T 2207/20081; G06T 2207/10028; G06T 2207/20084; G06T 9/00; G06T 7/50
   See application file for complete search history.

(56) References Cited

U.S. PATENT DOCUMENTS

| | | | |
|---|---|---|---|
| 2011/0090365 A1 | 4/2011 | Cha et al. | |
| 2016/0360081 A1* | 12/2016 | Tsubaki | H04N 23/683 |
| 2017/0064287 A1 | 3/2017 | Borisov | |
| 2018/0178667 A1 | 6/2018 | Cumoli et al. | |
| 2019/0108646 A1 | 4/2019 | Wang et al. | |
| 2020/0050904 A1* | 2/2020 | Powers | G06V 10/764 |
| 2021/0264649 A1 | 8/2021 | Gori et al. | |
| 2021/0312707 A1 | 10/2021 | Liang et al. | |
| 2022/0215564 A1* | 7/2022 | Sunarjo | G06T 19/20 |
| 2022/0230383 A1* | 7/2022 | Tian | G06V 10/26 |
| 2022/0237838 A1 | 7/2022 | Liu et al. | |
| 2022/0392162 A1 | 12/2022 | Shen et al. | |
| 2023/0071559 A1 | 3/2023 | Wang et al. | |
| 2023/0147722 A1 | 5/2023 | Ramirez de Chanlatte et al. | |
| 2023/0154051 A1 | 5/2023 | Tang et al. | |
| 2023/0224576 A1 | 7/2023 | Reddy et al. | |
| 2023/0245290 A1 | 8/2023 | Ng et al. | |
| 2023/0326158 A1 | 10/2023 | Shayani et al. | |
| 2024/0074817 A1* | 3/2024 | Richter | G06T 7/13 |

OTHER PUBLICATIONS

Zhang et al., "NeRFusion: Fusing Radiance Fields for Large-Scale Scene Reconstruction", IEEE/CVF Conference on Computer Vision and Pattern Recognition, 2022, pp. 5449-5458.
Zhang, Zhengyou, "Microsoft Kinect Sensor and Its Effect", Multimedia at Work, IEEE, Apr.-Jun. 2012, pp. 4-10.
Zhou et al., "Open3D: A Modern Library for 3D Data Processing", arXiv:1801.09847, Jan. 30, 2018, pp. 1-6.
Zhu et al., "NICE-SLAM: Neural Implicit Scalable Encoding for SLAM", IEEE/Cvf Conference on Computer Vision and Pattern Recognition, 2022, pp. 12786-12796.
Chen et al., "Point-Based Multi-View Stereo Network", arXiv:1908.04422, Aug. 12, 2019, pp. 1-13.
Hou et al., "Multi-View Stereo by Temporal Nonparametric Fusion", ICCV, 2019, pp. 2651-2660.
Yu et al., "Fast-MVSNet: Sparse-to-Dense Multi-View Stereo With Learned Propagation and Gauss-Newton Refinement", CVPR, 2020, pp. 1949-1958.
Zou et al., "MonoNeuralFusion: Online Monocular Neural 3D Reconstruction with Geometric Priors", arXiv:2209.15153, Sep. 30, 2022, pp. 1-13.
Azinovic et al., "Neural RGB-D Surface Reconstruction", 2022, pp. 1-21.
Bi et al., "Patch-Based Optimization for Image-Based Texture Mapping", ACM Transactions on Graphics, DOI: http://dx.doi.org/10.1145/3072959.3073610, vol. 36, No. 4, Article 106, Jul. 2017, pp. 106:1-106:11.
Chen et al., "MVSNeRF: Fast Generalizable Radiance Field Reconstruction from Multi-View Stereo", 2021, 13 pages.
Cheng et al., "Deep Stereo using Adaptive Thin Volume Representation with Uncertainty Awareness", IEEE/CVF Conference on Computer Vision and Pattern Recognition, 2020, pp. 2524-2534.
Dai et al., "ScanNet: Richly-annotated 3D Reconstructions of Indoor Scenes", CVPR, 2017, pp. 5828-5839.
Dai et al., "BundleFusion: Real-time Globally Consistent 3D Reconstruction using On-the-fly Surface Re-integration", arXiv:1604.01093, Article 1, Feb. 7, 2017, pp. 1:1-1:19.
Deng et al., "Depth-supervised NeRF: Fewer Views and Faster Training for Free", IEEE/CVF Conference on Computer Vision and Pattern Recognition, 2022, pp. 12882-12891.
Duzceker et al., "DeepVideoMVS: Multi-View Stereo on Video with Recurrent Spatio-Temporal Fusion", arXiv:2012.02177, Dec. 3, 2020, 16 pages.
Eigen et al., "Depth Map Prediction from a Single Image using a Multi-Scale Deep Network", 2014, pp. 1-9.
Guo et al., "Neural 3D Scene Reconstruction with the Manhattan-world Assumption", IEEE/CVF Conference on Computer Vision and Pattern Recognition, 2022, pp. 5511-5520.
He et al., "Deep Residual Learning for Image Recognition", IEEE Conference on Computer Vision and Pattern Recognition, 2016, pp. 770-778.
Huang et al., "DI-Fusion: Online Implicit 3D Reconstruction with Deep Priors", arXiv:2012.05551, Mar. 26, 2021, pp. 1-10.
Huang et al., "DeepMVS: Learning Multi-view Stereopsis", arXiv:1804.00650, Apr. 2, 2018, 10 pages.
Johari et al., "GeoNeRF: Generalizing NeRF with Geometry Priors", IEEE/CVF Conference on Computer Vision and Pattern Recognition, 2022, pp. 18365-18375.
Li et al., "BNV-Fusion: Dense 3D Reconstruction using Bi-level Neural Volume Fusion", 2022, 10 pages.
Liu et al., "Neural Sparse Voxel Fields", arXiv:2007.11571, Jul. 22, 2020, pp. 1-20.
Long et al., "SparseNeuS: Fast Generalizable Neural Surface Reconstruction from Sparse Views", arXiv:2206.05737, Aug. 2, 2022, 22 pages.
Luo et al., "P-MVSNet: Learning Patch-wise Matching Confidence Aggregation for Multi-View Stereo", IEEE/CVF International Conference on Computer Vision, 2019, pp. 10452-10461.
Luo et al., "Consistent Video Depth Estimation", ACM Transactions on Graphics, https://doi.org/10.1145/3386569.3392377, vol. 39, No. 4, Article 71, Jul. 2020, pp. 71:1-71:13.
Merrell et al., "Real-Time Visibility-Based Fusion of Depth Maps", IEEE, 2007, 8 pages.
Mildenhall et al., "NeRF: Representing Scenes as Neural Radiance Fields for View Synthesis", arXiv:2003.08934, Aug. 3, 2020, pp. 1-25.
Murez et al., "Atlas: End-to-End 3D Scene Reconstruction from Posed Images", arXiv:2003.10432, Oct. 14, 2020, pp. 1-18.
Newcombe et al., "KinectFusion: Real-Time Dense Surface Mapping and Tracking", IEEE International Symposium on Mixed and Augmented Reality, Oct. 26-29, 2011, pp. 127-136.
Niemeyer et al., "Differentiable Volumetric Rendering: Learning Implicit 3D Representations without 3D Supervision", 2020, 12 pages.
Nowacki et al., "Capabilities of ARCore and ARKit Platforms for AR/VR Applications", https://doi.org/10.1007/978-3-030-19501-4_36, 2019, pp. 358-370.
Oechsle et al., "UNISURF: Unifying Neural Implicit Surfaces and Radiance Fields for Multi-View Reconstruction", IEEE/CVF International Conference on Computer Vision, 2021, pp. 5589-5599.
Ortiz et al., "iSDF: Real-Time Neural Signed Distance Fields for Robot Perception", arXiv:2204.02296, May 4, 2022, 16 pages.
Peng et al., "Convolutional Occupancy Networks", arXiv:2003.04618, Aug. 1, 2020, pp. 1-17.
Roessle et al., "Dense Depth Priors for Neural Radiance Fields from Sparse Input Views", IEEE/CVF Conference on Computer Vision and Pattern Recognition, 2022, pp. 12892-12901.
Ronneberger et al., "U-Net: Convolutional Networks for Biomedical Image Segmentation", arXiv:1505.04597, May 18, 2015, pp. 1-8.
Schonberger et al., "Structure-from-Motion Revisited", CVPR, 2016, pp. 4104-4113.
Schonberger et al., "Pixelwise View Selection for Unstructured Multi-View Stereo", Springer, ECCV, DOI: 10.1007/978-3-319-46487-9 31, 2016, pp. 501-518.

(56) References Cited

OTHER PUBLICATIONS

Sitzmann et al., "Implicit Neural Representations with Periodic Activation Functions", arXiv:2006.09661, Jun. 17, 2020, 35 pages.
Smisek et al., "3D with Kinect", Consumer Depth Cameras for Computer Vision, Springer, DOI 10.1007/978-1-4471-4640-7_1, 2013, pp. 3-25.
Sucar et al., "iMAP: Implicit Mapping and Positioning in Real-Time", arXiv:2103.12352, Sep. 13, 2021, 10 pages.
Sun et al., "Direct Voxel Grid Optimization: Super-fast Convergence for Radiance Fields Reconstruction", IEEE/CVF Conference on Computer Vision and Pattern Recognition, 2022, pp. 5459-5469.
Sun et al., "NeuralRecon: Real-Time Coherent 3D Reconstruction from Monocular Video", arXiv:2104.00681, Apr. 1, 2021, pp. 1-10.
Takikawa et al., "Neural Geometric Level of Detail: Real-time Rendering with Implicit 3D Shapes", IEEE, 2021, pp. 11358-11367.
Wang et al., "GO-Surf: Neural Feature Grid Optimization for Fast, High-Fidelity RGB-D Surface Reconstruction", arXiv:2206.14735, Sep. 17, 2022, 19 pages.
Wang et al., "NeuS: Learning Neural Implicit Surfaces by Volume Rendering for Multi-view Reconstruction", arXiv:2106.10689, Jun. 20, 2021, pp. 1-22.
Wang et al., "IBRNet: Learning Multi-View Image-Based Rendering", IEEE/CVF Conference on Computer Vision and Pattern Recognition, 2021, pp. 4690-4699.
Wei et al., "NerfingMVS: Guided Optimization of Neural Radiance Fields for Indoor Multi-view Stereo", IEEE/CVF International Conference on Computer Vision, 2021, pp. 5610-5619.
Williams et al., "Neural Fields as Learnable Kernels for 3D Reconstruction", IEEE/CVF Conference on Computer Vision and Pattern Recognition, 2022, pp. 18500-18510.
Wu et al., "PointConv: Deep Convolutional Networks on 3D Point Clouds", IEEE/CVF Conference on Computer Vision and Pattern Recognition, 2019, pp. 9621-9630.
Xu et al., "Point-NeRF: Point-based Neural Radiance Fields", IEEE/CVF Conference on Computer Vision and Pattern Recognition, 2022, pp. 5438-5448.
Yao et al., "MVSNet: Depth Inference for Unstructured Multi-view Stereo", ECCV, 2018, pp. 1-17.
Yariv et al., "vol. Rendering of Neural Implicit Surfaces", 35th Conference on Neural Information Processing Systems, arXiv:2106.12052, Dec. 1, 2021, pp. 1-19.
Yariv et al., "Multiview Neural Surface Reconstruction by Disentangling Geometry and Appearance", 34th Conference on Neural Information Processing Systems, arXiv:2003.09852, Oct. 25, 2020, pp. 1-18.
Yen-Chen et al., "iNeRF: Inverting Neural Radiance Fields for Pose Estimation", arXiv:2012.05877, Dec. 10, 2020, pp. 1-12.
Yu et al., "MonoSDF: Exploring Monocular Geometric Cues for Neural Implicit Surface Reconstruction", 36th Conference on Neural Information Processing Systems, arXiv:2206.00665, Oct. 12, 2022, pp. 1-37.
Non Final Office Action received for U.S. Appl. No. 18/497,940 dated Aug. 22, 2025, 29 pages.
Notice of Allowance received for U.S. Appl. No. 18/497,938 dated Sep. 9, 2025, 24 pages.
Final Office Action received for U.S. Appl. No. 18/497,940 dated Dec. 30, 2025, 23 pages.

* cited by examiner

TECHNIQUES FOR FINE-TUNING A MACHINE LEARNING MODEL TO RECONSTRUCT A THREE-DIMENSIONAL SCENE

CROSS-REFERENCE TO RELATED APPLICATIONS

This application claims priority benefit of the United States Provisional Patent Application titled "RGB-D RECONSTRUCTION WITH GENERALIZED NEURAL IMPLICIT FIELDS," filed on Nov. 15, 2022, and having Ser. No. 63/383,880. The subject matter of this related application is hereby incorporated herein by reference.

BACKGROUND

Field of the Various Embodiments

The various embodiments relate generally to computer science and artificial intelligence and, more specifically, to techniques for fine-tuning a machine learning model to reconstruct a three-dimensional scene.

DESCRIPTION OF THE RELATED ART

Scene reconstruction refers to the process of generating a digital three-dimensional (3D) representation of a scene using a set of source images of the scene. The set of source images typically includes different red, green, and blue (RGB) images or different red, green, blue, and depth (RGBD) images of the scene captured from multiple different viewpoints. The 3D representation of the scene can then be used to generate or "render" different images of the scene from arbitrary viewpoints.

In one approach to scene reconstruction, a software application trains a neural network to interpolate between a set of source images of a scene in order to represent the scene in three dimensions. During each of any number of training epochs, the software application uses the partially-trained neural network to render a set of images from the different viewpoints associated with the set of source images. The software application then computes a reconstruction loss between the set of rendered images and the set of source images. The software application subsequently modifies the values of learnable parameters included in the partially-trained neural network to reduce the reconstruction loss. The software application continues to modify the neutral network in this fashion until a training goal (e.g., an acceptable reconstruction loss) is achieved.

One drawback of the above approach is that a different neural network has to be trained from scratch to generate a 3D representation for each given scene. In that regard, generating an effective 3D representation for even a relatively simple scene typically requires a complex neural network that includes a vast number of learnable parameters. Accordingly, the amount of processing resources required to generate multiple trained neural networks and the amount of memory required to store corresponding sets of learnable parameter values for those trained neural networks in order to generate 3D representations for multiple scenes can be prohibitive.

As the foregoing illustrates, what is needed in the art are more effective techniques for generating three-dimensional representations for scenes.

SUMMARY

One embodiment sets forth a computer-implemented method for generating three-dimensional (3D) representations of scenes. The method includes computing a first 3D feature grid based on a set of red, blue, green, and depth (RGBD) images associated with a first scene; mapping the first 3D feature grid to a first 3D representation of the first scene; computing a first reconstruction loss based on the first 3D representation and the set of RGBD images; and modifying at least one of the first 3D feature grid, a first pre-trained geometry decoder, or a first pre-trained texture decoder based on the first reconstruction loss to generate a second 3D representation of the first scene.

At least one technical advantage of the disclosed techniques relative to the prior art is that, with the disclosed techniques, a single trained neural network can be used to generate three-dimensional (3D) representations for multiple scenes. In that regard, with the disclosed techniques, a neural network is trained to generate a 3D representation of any portion of any scene based on a single RGBD image and a viewpoint associated with the single RGBD image. The resulting trained neural network can then be used to map a set of RGBD images for any given scene and viewpoints associated with those RGBD images to generate a 3D representation of that scene. Because only a single neural network is trained and only a single set of values for the learnable parameters is stored, the amount of processing resources and the amount of memory required to generate 3D representations for multiple scenes can be reduced relative to what can be achieved using prior art scene reconstruction techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

System Overview

Figure 1:
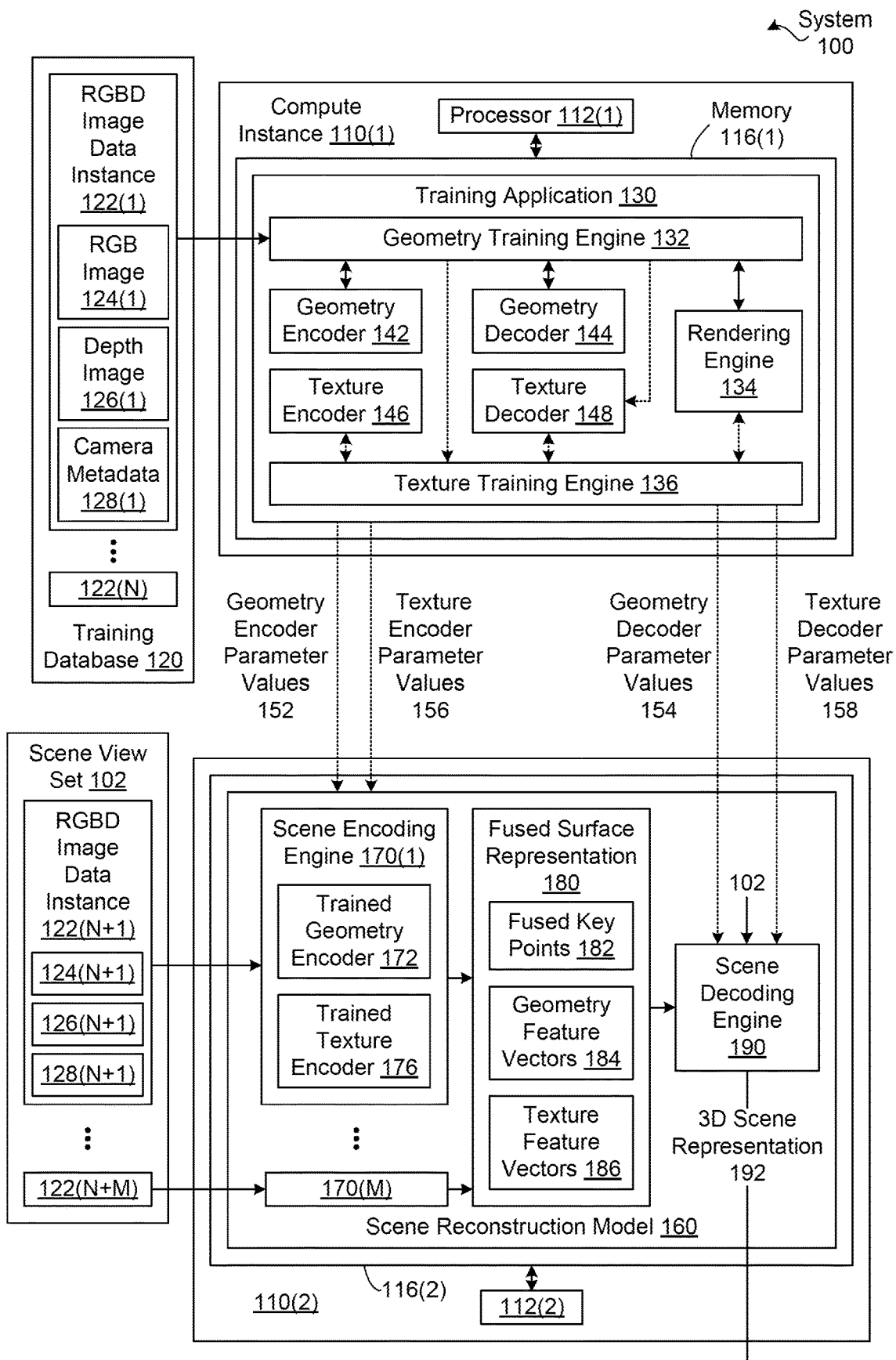
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a compute instance 110(1), a compute instance 110(2), a training database 120, and a scene view set 102. In some other embodiments, the compute instance 110(1), the compute instance 110(2), the training database 120, the scene view set 102, or any combination thereof can be omitted from the system 100. In the same or other embodiments, the system 100 can include, without limitation, any number of other compute instances and any number of other scene view sets. In some embodiments, the components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). For explanatory purposes, the compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each of the compute instances 110 can be implemented in a cloud computing environment, implemented as part of any other distributed computing environment, or implemented in a stand-alone fashion.

The processor 112 can be any instruction execution system, apparatus, or device capable of executing instructions. For example, the processor 112 could be a central processing unit, a graphics processing unit, a controller, a microcontroller, a state machine, or any combination thereof. The memory 116 of the compute instance 110 stores content, such as software applications and data, for use by the processor 112 of the compute instance 110. The memory 116 can be one or more of a readily available memory, such as random-access memory, read-only memory, floppy disk, hard disk, or any other form of digital storage, local or remote.

In some other embodiments, each compute instance 110 can include any number of processors 112 and any number of memories 116 in any combination. In particular, any number of the compute instances 110 (including one) and/or any number of other compute instances can provide a multiprocessing environment in any technically feasible fashion.

In some embodiments, a storage (not shown) may supplement or replace the memories 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In general, each compute instance 110 is configured to implement one or more software applications. For explanatory purposes only, each software application is described as residing in the memory 116 of a single compute instance (e.g., the compute instance 110(1) or the compute instance 110(2)) and executing on the processor 112 of the single compute instances.

In some embodiments, any number of instances of any number of software applications can reside in the memory 116 and any number of other memories associated with any number of other compute instances and execute on the processor 112 of the compute instance 110 and any number of other processors associated with any number of other compute instances in any combination. In the same or other embodiments, the functionality of any number of software applications can be distributed across any number of other software applications that reside in the memory 116 and any number of other memories associated with any number of other compute instances and execute on the processor 112 and any number of other processors associated with any number of other compute instances in any combination. Further, subsets of the functionality of multiple software applications can be consolidated into a single software application.

In some embodiments, the compute instance 110(2) is configured to generate 3D representations of scenes. A 3D representation of a scene can be used to render different images of the scene from arbitrary viewpoints. As described previously here, in a conventional approach to generating a 3D representation of a scene, a software application iteratively trains a neural network to interpolate between a set of source images of a scene in order to represent the scene in three dimensions. One drawback of such an approach is that a different neural network has to be trained from scratch to generate a 3D representation for each given scene. Accordingly, the amount of processing resources required to generate multiple trained neural networks and the amount of memory required to store corresponding sets of learnable parameter values for those trained neural networks in order to generate 3D representations for multiple scenes can be prohibitive.

Training an ML Model to Generate 3D Representations of RGBD Images

To address the above problems, in some embodiments, the compute instance 110(1) includes, without limitation, a training application 130 that trains a machine learning (ML) model to generate a 3D representation of any portion of any scene based on a single RGBD image and a viewpoint associated with the single RGBD image. As referred to herein, "training" the ML model refers to learning values for learnable parameters that are included in the ML model. After training, a version of the trained ML model that includes the learned parameters is designated as a scene reconstruction model 160. Generating the scene reconstruction model 160 is described in greater detail below in conjunction with FIGS. 1, 2, and 3A-3B.

As shown, in some embodiments, the compute instance 110(2) includes the scene reconstruction model 160. Notably, the scene reconstruction model 160 can be used to map a set of one or more RGBD images for any given scene and viewpoint(s) associated with those RGBD image(s) to generate a 3D representation of that scene. In some embodiments, the scene reconstruction model 160 is configured to perform generalized scene reconstruction for any number of scenes using the same learned parameter values. Performing generalized scene reconstruction using the scene reconstruction model 160 is described in greater detail below in conjunction with FIGS. 1, 4, and 5A-5B.

In some other embodiments, the scene reconstruction model 160 is configured to iteratively fine-tune some of the learned parameter values and a fused surface representation that is internal to the scene reconstruction model 160 for each different scene. Accordingly, different learned parameters are ultimately used to generate 3D representations of different scenes. Fine-tuning the scene reconstruction model 160 for a given scene can increase the accuracy of the 3D representation of that scene relative to performing generalized scene reconstruction. Fine-tuning the scene reconstruction model 160 for a given scene is described in greater detail below in conjunction with FIGS. 1,6, and 7.

As shown, the training application 130 resides in the memory 116(1) of the compute instance 110(1) and executes on the processor 112(1) of the compute instance 110(1). The training application 130 generates geometry encoder parameter values 152, geometry decoder parameter values 154, texture encoder parameter values 156, and texture decoder parameter values 158 based on the training database 120.

As shown, the training database 120 includes an RGBD image data instance 122(1)—an RGBD image data instance 122(N), where N can be any positive integer. Each of the RGBD image data instance 122(1)—the RGBD image data instance 122(N) describes an RGBD image of an associated scene captured from an associated viewpoint in any technically feasible fashion. As used herein, an "RGBD image" refers to a combination of an RGB image and an associated depth image.

As shown, in some embodiments, the RGBD image data instance 122(1) includes an RGB image 124(1), a depth image 126(1), and camera metadata 128(1). The RGB image 124(1) and the depth image 126(1) specify an RGB value and a depth value, respectively, for each of any number of pixels. Although not shown, for an integer variable denoted as x having values from 2 through N, the RGBD image data instance 122(x) includes an RGB image 124(x), a depth image 126(x), and camera metadata 128(x).

An RGB value includes a red component, a green component, and a blue component. Camera metadata included in a given RGBD image data instance specifies a viewpoint from which an RGB image included in that RGBD image data instance and a depth image included in that RGBD image data instance are captured in any technically feasible fashion. For instance, in some embodiments, each of the camera metadata 128(1)—the camera metadata 128(N) includes a camera pose and an intrinsic matrix. A camera pose includes a rotation matrix that is denoted herein as R and a 3D translation that is denoted as t. An intrinsic matrix defines intrinsic properties of an associated camera and is denoted herein as K.

Notably, the training database 120 represents S different scenes, where S can be any integer from 1 through N. For instance, in some embodiments, the RGBD image data instance 122(1)—the RGBD image data instance 122(N) describe RGBD images of N different scenes. In some other embodiments, at least two of the RGBD image data instance 122(1)—the RGBD image data instance 122(N) describe different images of the same scene captured from different viewpoints.

As described in greater detail below, the geometry encoder parameter values 152, the geometry decoder parameter values 154, the texture encoder parameter values 156, and the texture decoder parameter values 158 are learned parameter values that the training application 130 integrates into an untrained version of the scene reconstruction model 160 to generate the scene reconstruction model 160. Integrating the geometry encoder parameter values 152, the geometry decoder parameter values 154, the texture encoder parameter values 156, and the texture decoder parameter values 158 into an untrained version of the scene reconstruction model 160 is also referred to herein as "training the scene reconstruction model 160."

As shown, the training application 130 includes, without limitation, a geometry encoder 142, a geometry decoder 144, a texture encoder 146, a texture decoder 148, a geometry training engine 132, a rendering engine 134, and a texture training engine 136. The geometry encoder parameter values 152, the geometry decoder parameter values 154, the texture encoder parameter values 156, and the texture decoder parameter values 158 are learned parameter values for the geometry encoder 142, the geometry decoder 144, the texture encoder 146, and the texture decoder 148, respectively.

As initially described below and subsequently described in greater detail further below in conjunction with FIG. 2, the training application 130 sequentially implements two training phases. As described in greater detail below, during the first training phase the geometry training engine 132 iteratively reduces geometry reconstruction losses over the training database 120. During the second training phase the geometry training engine 132 and the texture training engine 136 iteratively reduce RGBD reconstruction losses over the training database 120.

For explanatory purposes, solid arrows associated with the training application 130 depict data transfers corresponding to both a first training phase and a second training phase. By contrast, dashed arrows associated with the training application 130 depict data transfers that are associated with only the second training phase.

During both training phases, the geometry training engine 132 jointly trains the geometry encoder 142 and the geometry decoder 144 for use in mapping a depth image and an associated viewpoint (e.g., camera metadata) to signed distance function (SDF) values. Each SDF value is associated with a different 3D point and specifies a shortest distance of the 3D point to a surface of an object represented in the depth image. A negative SDF value indicates that the associated 3D point is inside the associated object. A positive SDF value indicates that the associated 3D point is outside the associated object. A zero SDF value indicates that the associated 3D point is at the surface of the associated object.

The geometry training engine 132 can execute any number and/or types of unsupervised machine learning operations and/or machine learning algorithms on the geometry encoder 142 and the geometry decoder 144 and over the training database 120. For explanatory purposes, the functionality of the geometry training engine 132 during the first training phase is described herein in the context of executing a first exemplary iterative machine learning algorithm over the training database 120 for any number of epochs based on a mini-batch size of one. In some other embodiments, the geometry training engine 132 can execute the first exemplary iterative training process or any other type of iterative training process over any number of RGBD image data instances for any number of epochs based on any mini-batch size, and the techniques described below are modified accordingly.

To initiate each iteration of an epoch, the training application 130 selects an RGBD image data instance 122(x) from the training database 120, where x can be any integer from 1 through N. The geometry training engine 132 generates a point cloud (not shown) based on the depth image 126(x) and the camera metadata 128(x). The geometry training engine 132 uses the geometry encoder 142 to map the point cloud to a geometric surface representation of the depth image 126(x).

As persons skilled in the art will recognize, a geometric surface representation of a depth image is also a geometric surface representation of an RGBD image that includes the depth image. Similarly, a geometric surface representation of an RGBD image associated with a scene is also a geometric surface representation of at least a portion of the scene.

The geometric surface representation includes any number of key points and a different geometry feature vector for each of the key points. Collectively, the key points represent a discrete form of the surfaces associated with the depth image 126(x). Individually, each of the key points is a different 3D point in a world coordinate system.

The geometry training engine 132 computes a different geometry input vector (not shown in FIG. 1) for each of any number of query points (not shown in FIG. 1) based on the geometric surface representation. Each query point is a sampled point along any ray. The geometry training engine 132 maps the geometry input vectors to SDF values (not shown in FIG. 1) using the geometry decoder 144. Each SDF value is a predicted SDF value for a different query point.

The query points and the associated SDF values are a geometric 3D representation of the depth image 126(x). As persons skilled in the art will recognize, a geometric 3D representation of a depth image is also a geometric 3D representation of an RGBD image that includes the depth image. Similarly, a geometric surface representation of an RGBD image associated with a scene is also a geometric surface representation of at least a portion of the scene.

As described in greater detail below in conjunction with FIG. 2, the geometry training engine 132 computes a geometric reconstruction loss (not shown) based on the depth image 126(x), the camera metadata 128(x), and the SDF values. As part of computing the geometric reconstruction loss, the geometry training engine 132 computes SDF gradients (not shown in FIG. 1) for the query points and generates a reconstructed depth image (not shown). Each of the SDF gradients is a gradient of the SDF value of a different query point with respect to the 3D position of the query point.

The training application 130 configures the rendering engine 134 to generate a reconstructed depth image (not shown) based on the query points, the associated SDF values, and the camera metadata 128(x). The rendering engine 134 can implement any number and/or types of volume rendering operations and/or volume rendering algorithms to generate the reconstructed depth image based, at least in part, on the associated SDF values.

To complete the iteration, the geometry training engine 132 updates the values of any number of the learnable parameters of the geometry decoder 144 and the geometry encoder 142 based on a goal of reducing the geometric reconstruction loss.

The geometry training engine 132 can determine that the first training phase is complete based on any number and/or types of triggers. Some examples of triggers are executing a maximum number of epochs and determining that the geometry reconstruction loss is no greater than a maximum acceptable loss. After the geometry training engine 132 determines that the first training phase is complete, the training application 130 executes the second training phase.

During the second training phase, the training application 130 jointly trains the geometry encoder 142, the geometry decoder 144, the texture encoder 146, and the texture decoder 148 for use in generating a 3D representation of any portion of any scene based on a single RGBD image and a viewpoint associated with the single RGBD image. More precisely, in some embodiments, the training application 130 trains an implicit, composite machine learning model to generate a 3D representation of any portion of any scene based on a single RGBD image data instance.

The implicit, composite machine learning model includes the geometry encoder 142, the geometry decoder 144, the texture encoder 146, and the texture decoder 148. The 3D representation includes any number of query points, where each query point is associated with both an SDF value and a radiance value. Each radiance value includes a red component, a green component, and a blue component.

During the second training phase, the geometry training engine 132 and the texture training engine 136 can collaborate to execute any number and/or types of unsupervised machine learning operations and/or machine learning algorithms on the geometry encoder 142, the geometry decoder 144, the texture encoder 146, and the texture decoder 148 over the training database 120. Notably, the parameter values of the geometry encoder 142 and the geometry decoder 144 at the beginning of the second training phase are the same as the parameter values of the geometry encoder 142 and the geometry decoder 144 at the end of the first training phase.

For explanatory purposes, the functionality of the training application 130, the geometry training engine 132, and the texture training engine 136 during the second phase are described herein in the context of executing a second iterative machine learning algorithm over the training database 120 for any number of epochs based on a mini-batch size of one. In some other embodiments, the geometry training engine 132 and the texture training engine 136 can execute the second exemplary iterative training process or any other type of iterative training process over any number of RGBD image data instances for any number of epochs based on any mini-batch size, and the techniques described below are modified accordingly.

To initiate each iteration of an epoch, the training application 130 selects an RGBD image data instance 122(x) from the training database 120, where x can be any integer from 1 through N. The geometry training engine 132 generates a geometric 3D representation of at least a portion of a scene based on the depth image 126(x) and the camera metadata 128(x) using the same process described previously herein in conjunction with the first training phase. In contrast to the first training phase, the geometry training engine 132 transmits the key points, the query points, and the SDF gradients to the texture training engine 136.

The texture training engine 136 uses the texture encoder 146 to generate a texture surface representation of the RGB image 124(x) based on the RGB image 124(x), the camera metadata 128(x), and the key points included in the geometric surface representation. The texture surface representation includes the key points and a different texture feature vector for each of the key points.

As persons skilled in the art will recognize, a texture surface representation of an RGB image is also a texture surface representation of an RGBD image that includes the RGB image. Similarly, a texture surface representation of an RGBD image associated with a scene is also a texture surface representation of at least a portion of the scene.

Notably, the key points, the associated geometry feature vectors, and the associated texture feature vectors are collectively referred to herein as a surface representation of the RGBD image that includes the RGB image 124(x) and the depth image 126(x). The surface representation is in a bounded 3D space that is also referred to herein as a "volumetric space." As persons skilled in the art will recognize, a surface representation of an RGBD image associated with a scene is also a surface representation of at least a portion of the scene.

The texture training engine 136 generates a different texture input vector (not shown in FIG. 1) for each query point based on the texture surface representation and the SDF gradients. The texture training engine 136 maps the texture input vectors to radiance values that are associated with the query points using the texture decoder 148. More specifically, each query point is associated with a different radiance value.

The query points and the associated radiance values are a texture 3D representation of the RGB image 124(x). As persons skilled in the art will recognize, a texture 3D representation of the RGB image 124(x) is also a texture 3D representation of an RGBD image that includes the RGB image 124(x) and the depth image 126(x). Similarly, a texture 3D representation of an RGBD image associated with a scene is also a texture 3D representation of at least a portion of the scene.

The query points, the associated SDF values, and the associated radiance values are a 3D representation of an RGBD image that includes the RGB image 124(x) and the depth image 126(x). As persons skilled in the art will recognize, a 3D representation of an RGBD image associated with a scene is also a 3D representation of at least a portion of the scene.

The training application 130 configures the rendering engine 134 to generate a reconstructed RGB image and a reconstructed depth image based on the query points, the associated radiance values, the associated SDF values, and the camera metadata 128(x). The rendering engine 134 can implement any number and/or types of volume rendering operations and/or volume rendering algorithms to generate the reconstructed RGB image based, at least in part, on the associated SDF values. The training application 130, the geometry training engine 132, the texture training engine 136, or any combination thereof compute an RGBD reconstruction loss based on the RGB image 124(x), the depth image 126(x), the reconstructed RGB image, the reconstructed depth image, and the SDF values.

To complete the iteration, the geometry training engine 132 updates the values of any number of the learnable parameters of the geometry encoder 142 and the geometry decoder 144 and the texture training engine 136 updates the values of any number of the learnable parameters of the texture encoder 146 and the texture decoder 148 based on a goal of reducing the RGBD reconstruction loss.

The training application 130 can determine that the second training phase and therefore the training of the overall, implicit machine learning model is complete based on any number and/or types of triggers. Some examples of triggers are executing a maximum number of epochs and determining that the RGBD reconstruction loss is no greater than a maximum acceptable loss.

After determining that the second training phase is complete, the training application 130 sets the geometry encoder parameter values 152, the geometry decoder parameter values 154, the texture encoder parameter values 156, and the texture decoder parameter values 158 to the learned parameter values of the geometry encoder 142, the geometry decoder 144. the texture encoder 146, and the texture decoder 148 respectively.

The training application 130 then causes the geometry encoder parameter values 152, the geometry decoder parameter values 154, the texture encoder parameter values 156, and the texture decoder parameter values 158 to be integrated into an untrained version of the scene reconstruction model 160 to generate the scene reconstruction model 160 in any technically feasible fashion.

In some embodiments, the untrained version of the scene reconstruction model 160 includes untrained versions of the geometry encoder 142, the geometry decoder 144, the texture encoder 146, and the texture decoder 148. As shown, the training application 130 transmits the geometry encoder parameter values 152, the geometry decoder parameter values 154, the texture encoder parameter values 156, and the texture decoder parameter values 158 to the untrained version of the scene reconstruction model 160 in order to overwrite the current corresponding parameter values, thereby generating the scene reconstruction model 160.

In the same or other embodiments, the training application 130 can store in any number and/or types of memories and/or transmit to any number of other software applications (including any number of other machine learning models) the geometry encoder parameter values 152, the geometry decoder parameter values 154, the texture encoder parameter values 156, and the texture decoder parameter values 158.

Advantageously, the training application 130 is executed a single time to generate a single set of values for the learnable parameters included in the scene reconstruction model 160. As described below, the scene reconstruction model 160 can be used to map a set of any number of RGBD images for any given scene and viewpoints associated with those RGBD images to generate a 3D representation of that scene. Notably, the scene reconstruction model 160 can be used to map different sets of RGBD images for different scenes to corresponding 3D representations of those different scenes. Consequently, the amount of processing resources and the amount of memory required to generate 3D representations for multiple scenes can be reduced relative to what can be achieved using prior art scene reconstruction techniques.

As shown, the scene reconstruction model 160 resides in the memory 116(2) of the compute instance 110(2) and executes on the processor 112(2) of the compute instance 110(2). For explanatory purposes, the functionality of the scene reconstruction model 160 is described in detail below in the context of executing the scene reconstruction model 160 on the scene view set 102 corresponding to any target scene to generate a 3D scene representation 192 of the target scene. Notably, the 3D scene representation 192 of the target scene can be used to render different images of the target scene from arbitrary viewpoints.

As described in greater detail below, in some embodiments, the scene view set 102 includes M RGBD image data instances representing a set of M different RGBD images of a single scene captured from different viewpoints, where M can be any integer greater than 1. In some other embodiments, the scene view set 102 includes a single RGBD image data instance, and the techniques described herein are modified accordingly.

As persons skilled in the art will recognize, the scene reconstruction model 160 can be independently executed on any number of other scene view sets corresponding to any number of other scenes to independently generate any number of other 3D scene representations of those scenes. Notably, the number of RGBD image data instances included in each of the other scene view sets can vary across the other scene view sets (and therefore is not necessarily equal to M).

As shown, in some embodiments, the scene view set 102 includes an RGBD image data instance 122(N+1)—an RGBD image data instance 122(N+M), where M can be any integer>1. The RGBD image data instance 122(N+1)—the RGBD image data instance 122(N+M) describes M different RGBD images of the same scene captured from M different viewpoints in any technically feasible fashion.

As shown, in some embodiments, the RGBD image data instance 122(N+1) includes an RGB image 124(N+1), a depth image 126(N+1), and camera metadata 128(N+1) specifying an associated viewpoint. In some embodiments, for an integer variable denoted as y having values from (N+2) through (N+M), the RGBD image data instance 122(y) includes an RGB image 124(y), a depth image 126(y), and camera metadata 128(y).

As shown, the scene reconstruction model 160 includes a scene encoding engine 170(1)—a scene encoding engine 170(M), a fused surface representation 180, and a scene decoding engine 190. Each of the scene encoding engine 170(1)—the scene encoding engine 170(M) is a different instance of a single software application that is referred to herein as a "scene encoding engine 170."

As shown for the scene encoding engine 170(1), each instance of the scene encoding engine 170 includes, without limitation, a trained geometry encoder 172 and a trained texture encoder 176. As depicted with dashed arrows, the geometry decoder parameter values 154 and the texture decoder parameter values 158 overwrite parameter values included in untrained versions of the trained geometry encoder 172 and the trained texture encoder 176 respectively, to generate the trained geometry encoder 172 and the trained texture encoder 176.

The scene encoding engine 170(1)—the scene encoding engine 170(M) independently execute on the RGBD image data instance 122(N+1)—the RGBD image data instance 122(N+M), respectively, to generate M different surface representations of the corresponding images in a 3D space. As noted previously herein, a surface representation of an image associated with a scene is also a surface representation of at least a portion of the scene.

Notably, the M different surface representations correspond to R different portions of the scene, where R can be any integer from 1 through M. Any two portions of the scene can be non-overlapping or overlapping. As used herein, if a first portion and a second portion of a scene are overlapping, then at least part of the first portion of the scene overlaps with at least part of the second portion of the scene.

In general, the scene encoding engine 170 maps an RGBD image associated with both a scene and a viewpoint to a surface representation of at least a portion of the scene. For explanatory purposes, the functionality of the scene encoding engine 170 is described herein in the context of mapping the RGBD image data instance 122(N+1) to a first surface representation of a target portion of a target scene corresponding to the scene view set 102. More precisely, the scene encoding engine 170 maps the RGBD image that includes the RGB image 124(N+1) and the depth image 126(N+1) and a viewpoint specified by the camera metadata 128(N+1) to a surface representation of the target portion of the target scene.

The surface representation of the target portion of the target scene includes a geometric surface representation of the target portion of the target scene and a texture surface representation of the target portion of the target scene. More specifically, the surface representation of the target portion of the target scene includes a set of key points, where each of the key points is associated with a different geometry feature vector and a different texture feature vector. A key point is also referred to herein as a 3D surface point, and a set of key points is also referred to herein as a set of 3D surface points.

The geometric surface representation of the target portion of the target scene includes the set of key points associated with a set of geometry feature vectors. In particular, each key point in the geometric surface representation is associated with a different geometry feature vector. The texture surface representation of the target portion of the target scene includes the same set of key points associated with a set of texture feature vectors. In particular, each key point in the texture surface representation is associated with a different texture feature.

In operation, the scene encoding engine 170 projects the depth image 126(N+1) into a point cloud (not shown) based on the camera metadata 128(N+1). More precisely, the scene encoding engine 170 computes a point cloud using a rotation matrix, a 3D translation, and an intrinsic matrix included in the camera metadata 128(N+1). The point cloud includes any number of 3D points in a world coordinate system, where each 3D point is associated with a different depth value.

The scene encoding engine 170 uses the trained geometry encoder 172 to map the point cloud to the geometric surface representation of at least a portion of the target scene, More precisely, the scene encoding engine 170 sub-samples the point cloud via Farthest Point Sampling to generate a set of any number of key points (not shown). The key points represent a discrete form of the surfaces associated with the point cloud and therefore the depth image 126(N+1).

For each key point in the set of key points, the scene encoding engine 170 applies a K-nearest neighbor algorithm to select (K−1) other 3D points, where K can be any positive integer. The geometry encoder 142 constructs local regions (not shown) for the key points, where each local region includes a different key point and the (K−1) other 3D points associated with the key point. The trained geometry encoder 172 extracts the geometry feature vectors from the local regions. The extraction operations can be performed using any technically feasible approach. The scene encoding engine 170 associates each of the key points with the corresponding geometry feature vector in any technically feasible (e.g., via array indices) to generate the geometric surface representation of the target portion of the target scene.

The scene encoding engine 170 uses the trained texture encoder 176 to map the RGB image 124(N+1) and the set of key points to the texture surface representation of the target portion of the target scene. More precisely, the scene encoding engine 170 executes the trained texture encoder 176 on the RGB image 124(N+1) to generate pixel texture feature vectors (not shown). The pixel texture feature vectors include a different texture feature vector for each pixel included in the RGB image 124(N+1).

The scene encoding engine 170 projects the pixel texture feature vectors onto the key points included in the set of key points in accordance with the projection locations of the key points from the image plane to generate a different texture feature vector for each of the key points. The scene encoding engine 170 associates each of the key points with the corresponding texture feature vector in any technically feasible (e.g., via array indices) to generate the texture surface representation of the target portion of the target scene. The scene encoding engine 170 associates each of the key points with both the corresponding geometry feature vector and the corresponding texture feature vector to generate the surface representation of the target portion of the target scene.

As shown, the scene encoding engine 170 aggregates the M different surface representations generated by the scene encoding engine 170(1)—scene encoding engine 170(M) in a 3D space to generate the fused surface representation 180 of the target scene. The M different surface representations correspond to M portions of the target scene represented by the RGBD image data instance 122(N+1)—the RGBD image data instance 122(N+M).

As shown, the fused surface representation 180 includes fused key points 182, geometry feature vectors 184, and texture feature vectors 186. The fused key points 182 are the union of the set of key points included in the M different surface representations generated by the scene encoding engine 170(1)—the scene encoding engine 170(M). Each of the fused key points 182 is associated with a different one of the geometry feature vectors 184 and a different one of the texture feature vectors 186.

As described in greater detail below in conjunction with FIG. 4, in some embodiments, the scene decoding engine 190 performs generalized scene reconstruction. In such embodiments, the geometry decoder parameter values 154 and the texture decoder parameter values 158 overwrite parameter values included in untrained versions of the geometry decoder 144 and the texture decoder 148, respectively, to generate a trained geometry decoder and a trained texture decoder, respectively, that are included in the scene decoding engine 190.

As shown, to perform generalized scene reconstruction of the scene represented by the scene view set 102, the scene reconstruction model 160 executes the scene decoding engine 190 on the scene view set 102 and the fused surface representation 180. In response, the scene decoding engine 190 executes machine learning inference operations on the trained geometry decoder and the trained texture decoder to generate the 3D scene representation 192. Notably, the same learned parameter values are ultimately used to generate 3D representations of different scenes.

As described in greater detail below in conjunction with FIG. 6, in some embodiments, the scene decoding engine 190 performs fine-tuned scene reconstruction. In such embodiments, the geometry decoder parameter values 154 and the texture decoder parameter values 158 overwrite parameter values included in untrained versions of the geometry decoder 144 and the texture decoder 148, respectively, to generate a pre-trained geometry decoder and a pre-trained texture decoder, respectively, that are included in the scene decoding engine 190.

As shown, to perform fine-tuned scene reconstruction of the scene represented by the scene view set 102, the scene reconstruction model 160 executes the scene decoding engine 190 on the scene view set 102 and the fused surface representation 180. In response, the scene decoding engine 190 converts the fused surface representation 180 to a feature grid (not shown in FIG. 1). The scene decoding engine 190 then iteratively executes machine learning training operations on the feature grid, the pre-trained geometry decoder, and the pre-trained texture decoder to generate the 3D scene representation 192. Accordingly, different learned parameter values are ultimately used to generate 3D representations of different scenes.

Note that the techniques described herein are illustrative rather than restrictive and can be altered without departing from the broader spirit and scope of the invention. Many modifications and variations on the functionality of the training application 130, the geometry encoder 142, the geometry decoder 144, the texture encoder 146, the texture decoder 148, the geometry training engine 132, the rendering engine 134, the texture training engine 136, the scene reconstruction model 160, the scene encoding engine 170, and the scene decoding engine 190 as described herein will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Similarly, many modifications and variations on the training database 120, the RGBD image data instances, the camera metadata, the scene view set 102, the geometric surface representations, the texture surface representations, the surface representations, the geometric 3D representations, the texture 3D representations, the 3D scene representations (and the 3D scene representation 192) will be apparent to those of ordinary skill in the art without departing from the scope and spirit of the described embodiments.

It will be appreciated that the system 100 shown herein is illustrative and that variations and modifications are possible. For example, the functionality provided by the geometry encoder 142, the geometry decoder 144, the texture encoder 146, the texture decoder 148, the trained geometry encoder 172, the trained texture encoder 176, or any combination thereof as described herein can be integrated into or distributed across any number and/or types of ML models and/or any number of other types of software applications (including one) of the system 100. Further, the connection topology between the various units in FIG. 1 can be modified as desired.

Figure 2:
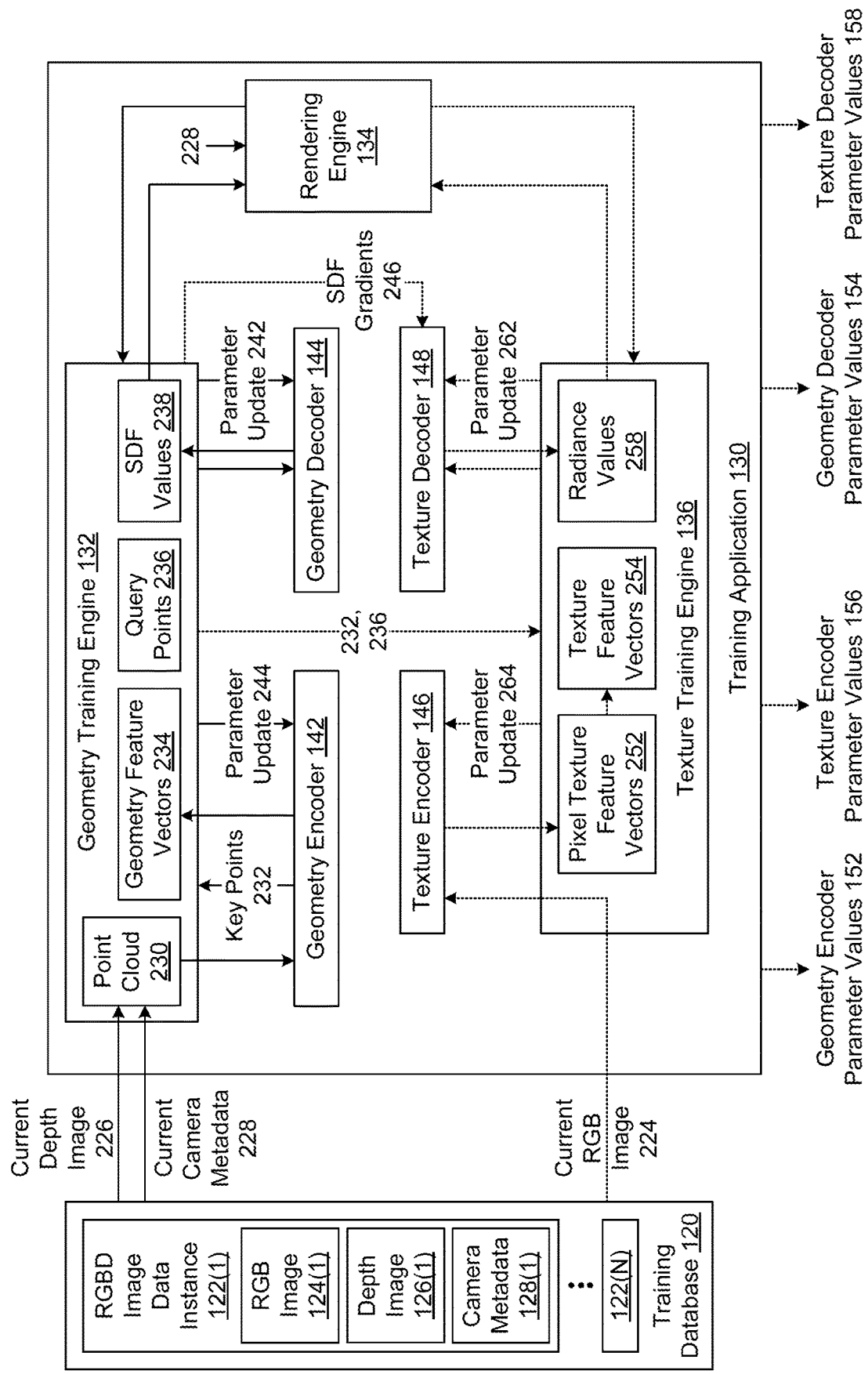
FIG. 2 is a more detailed illustration of the training application of FIG. 1, according to various embodiments.

FIG. 2 is a more detailed illustration of the training application 130 of FIG. 1, according to various embodiments. As described previously herein in conjunction with FIG. 1, the training application 130 generates geometry encoder parameter values 152, geometry decoder parameter values 154, texture encoder parameter values 156, and texture decoder parameter values 158 based on the training database 120.

As described previously herein in conjunction with FIG. 1, the training database 120 includes the RGBD image data instance 122(1)—the RGBD image data instance 122(N), where N can be any positive integer. For an integer variable denoted as x having values from 1 through N, the RGBD image data instance 122(x) includes the RGB image 124(x), the depth image 126(x), and the camera metadata 128(x). Notably, the training database 120 represents S different scenes, where S can be any integer from 1 through N.

As shown, the training application 130 includes, without limitation, the geometry encoder 142, the geometry decoder 144, the texture encoder 146, the texture decoder 148, the geometry training engine 132, the rendering engine 134, and the texture training engine 136. Each of the geometry encoder 142, the geometry decoder 144, the texture encoder 146, the texture decoder 148 includes one or more learnable parameters.

As described previously herein in conjunction with FIG. 1, the training application 130 sequentially implements two training phases. For explanatory purposes, solid arrows associated with the training application 130 depict data transfers corresponding to both a first training phase and a second training phase. By contrast, dashed arrows associated with the training application 130 depict data transfers that are associated with only the second training phase.

During the first training phase, the geometry training engine 132 jointly trains the geometry encoder 142 and the geometry decoder 144 for use in computing signed distance function (SDF) values for query points based on any depth image and associated camera metadata. For explanatory purposes, the functionality of the geometry training engine 132 during the first training phase is described herein in the context of executing a first exemplary iterative machine learning algorithm over the training database 120 for any number of epochs based on a mini-batch size of one. In some other embodiments, the geometry training engine 132 can execute the first exemplary iterative training process or any other type of iterative training process over any number of RGBD image data instances for any number of epochs based on any mini-batch size, and the techniques described below are modified accordingly.

As shown, the geometry training engine 132 includes a point cloud 230, geometry feature vectors 234, query points 236, and SDF values 238. The geometry training engine 132 can modify the parameter values of the geometry encoder 142 and the geometry decoder 144 during each mini-batch of each training phase.

To initiate each iteration of an epoch during the first training phase, the training application 130 selects the least recently selected RGBD image data instance 122 from the training database 120. The training application 130 sets a current depth image 226, a current RGB image 224, and a current camera metadata 228 equal to the depth image, the RGB image, and the camera metadata, respectively, included in the selected RGBD image data instance 122. For explanatory purposes, a "current RGBD image" includes the current RGB image 224 and the current depth image 226.

The geometry training engine 132 projects the current depth image 226 into the point cloud 230 based on the current camera metadata 228. More precisely, the geometry training engine 132 computes the point cloud 230 using a rotation matrix R, a 3D translation t, and an intrinsic matrix K included in the current camera metadata 228. The point cloud 230 includes any number of 3D points in a world coordinate system, where each 3D point is associated with a depth value.

As shown, the geometry training engine 132 uses the geometry encoder 142 to map the point cloud 230 to a geometric surface representation (not explicitly shown). The geometric surface representation includes key points 232 and geometry feature vectors 234, where there is a one-to-one correspondence between the key points 232 and the geometry feature vectors 234. The geometry encoder 142 can be any type of ML model (e.g., a neural network) that includes any number of learnable parameters.

The geometry encoder 142 sub-samples the point cloud 230 via Farthest Point Sampling to generate key points 232. The key points 232 represent a discrete form of the surfaces associated with the point cloud 230 and therefore the current depth image 226. For each of the key points 232, the geometry encoder 142 applies a K-nearest neighbor algorithm to select (K−1) other 3D points, where K can be any positive integer.

The geometry encoder 142 constructs local regions (not shown) for the key points 232, where each local region includes a different key point and the (K−1) other 3D points associated with the key point. The geometry encoder 142 extracts the geometry feature vectors 234 from the local regions. The extraction operations can be performed using any technically-feasible approach.

The geometry training engine 132 determines the query points 236 based on the geometric surface representation, the current depth image 226, and the current camera metadata 228. For each pixel included in the current depth image 226, the geometry training engine 132 generates a different back-projected ray and samples Q different points along the ray, where Q can be any positive integer. As used herein, $r_0$-$r_{(P-1)}$ denote ray directions of different back-projected rays associated with different pixels, where P is the total number of pixels included in the current depth image 226. In some embodiments, the geometry training engine generates the query points 236 using the following equation (1):

$$x_{p,q} = o + d_q r_p \text{ for } 0 \leq q < Q \text{ and } 0 \leq p < P \qquad (1)$$

In equation (1) and below, o denotes a camera center and $x_{p,q}$ denotes a 3D position of a query point that is sampled at a distance d q along a ray having a ray direction $r_p$. For explanatory purposes, $x_{p,q}$ is also used herein as an identifier for the query point having the 3D position $x_{p,q}$.

The geometry training engine 132 computes a different geometry input vector for each of the query points 236 based on the geometric surface representation. As used herein, $f_{geo}(x_{p,q})$ denotes a geometry feature vector associated with a query point $x_{p,q}$. To compute a geometry input vector for a query point, the geometry training engine 132 selects K of the key points 232 that are closest to that query point. The geometry training engine 132 applies distance-based spatial interpolation to compute a geometry feature vector for that query point based on the geometry feature vectors for the selected key points in any technically feasible fashion. In some embodiments, the geometry training engine 132 computes a different geometry feature vector for each query point $x_{p,q}$ using equations (2a) and (2b):

$$f_{geo}(x_{p,q}) = \Sigma_{v \in V} w_v f_{geo}(p_v) / \Sigma_{v \in V} w_v \qquad (2a)$$

$$w_v = \exp(-\|x_{p,q} - p_v\|) \qquad (2b)$$

In equations (2a) and (2b) and below, V denotes a set of indices of the K nearest key points to query point $x_{p,q}$, $p_v$ denotes the 3D position of the $v^{th}$ nearest key point to query point $x_{p,q}$, $f_{geo}(p_v)$ denotes a geometry feature vector associated with key point $p_v$, and $w_v$ denotes a distance between query point $x_{p,q}$ and key point $p_v$. For explanatory purposes, $p_v$ is also used herein as an identifier for the $v^{th}$ nearest key point to the query point $x_{p,q}$.

The geometry training engine 132 computes a positional encoding for each of the query points 236. For each of the query points 236, the geometry training engine 132 aggregates the associated positional encoding and the associated geometry feature to generate an associated geometry input vector.

As shown, the geometry training engine 132 maps the geometry input vectors to SDF values 238 using the geometry decoder 144. The SDF values 238 include a different predicted SDF value for each of the query points 236. The geometry decoder 144 can be any type of machine learning model that includes, without limitation, any number and/or types of learnable parameters. In some embodiments, the geometry decoder 144 is a Multi-layer Perceptron (MLP) that predicts SDF values using any technically-feasible approach to neural surface reconstruction. Collectively, the query points 236 and the SDF values 238 are a geometric 3D representation of the current depth image 226, a geometric 3D representation of the current RGBD image, and a geometric 3D representation of at least a portion of a scene associated with the current RGBD image.

The geometry training engine 132 or the training application 130 configures the rendering engine 134 to generate a reconstructed depth image (not shown) based on the query points 236, the SDF values 238, and the current camera metadata 228. The rendering engine 134 can implement any number and/or types of volume rendering operations and/or volume rendering algorithms based, at least in part, on the SDF values 238 to generate the reconstructed depth image.

The geometry training engine 132 computes SDF gradients 246 based on the SDF values 238 and the query points 236. Each of the SDF gradients 246 is a gradient of a predicted SDF value for a different query point with respect to the 3D position of that query point. The geometry training engine 132 can compute the SDF gradients 246 in any technically feasible fashion.

The geometry training engine 132 implements a geometric loss function to compute a geometric rendering loss based on the reconstructed depth image, the current depth image 226, and optionally the SDF values 238. In some embodiments, the training application 130 implements the geometric loss function using equation (3):

$$L_{geo} = \lambda_{depth} L_{depth} + \lambda_{sdf} L_{sdf} + \lambda_{eik} L_{eik} \quad (3)$$

In equation (3) and below, $L_{geo}$ denotes a geometric loss, $L_{depth}$ denotes a depth loss, $L_{sdf}$ denotes an approximated SDF loss, $L_{eik}$ denotes an Eikonal regularization term, and $\lambda_{depth}$, $\lambda_{sdf}$ and $\lambda_{eik}$ denote hyperparameters.

The depth loss is a pixel-wise rendering loss between the reconstructed depth image denoted as $D_{rec}(x, y)$ and the current depth image 226 denoted as $D(x, y)$. In some embodiments, the geometry training engine 132 computes the depth loss using equation (4):

$$L_{depth} = D_{rec}(X,y) - D(x,y) \quad (4)$$

To compute the approximated SDF loss, the geometry training engine 132 approximates a ground-truth SDF value for each query point based on the distance of the query point along the associated back-projected ray. An approximate ground-truth SDF value for a query point $x_{p,q}$ is denoted herein as $b(x_{p,q})$. In some embodiments, the geometry training engine 132 computes a different approximate ground-truth SDF value for each query point using equation (5):

$$b(x_{p,q}) = D(x,y) - d_q \quad (5)$$

In equation (5), $D(x, y)$ is the depth value included in the current depth image 226 for the pixel having a 2D position denoted as $(x, y)$ that is associated with the query point $b(x_{p,q})$.

If the absolute value of $b(x_{p,q})$ is less than or equal to an SDF truncation threshold, then the geometry training engine 132 determines that $x_{p,q}$ lies within a near-surface region and computes a "near" SDF loss for $x_{p,q}$. In some embodiments, the geometry training engine 132 computes near SDF losses using equation (6):

$$\text{if } |b(x_{p,q})| \le T \; L_{sdf} = |S(x_{p,q}) - b(x_{p,q})| \quad (6)$$

In equation (6) and below, $s(x_{p,q})$ denotes a predicted SDF value for query point $x_{p,q}$, and T denotes an SDF truncation threshold.

If, however, the absolute value of $b(x_{p,q})$ is greater than $\tau$, then the geometry training engine 132 determines that the query point lies outside a near-surface region and computes a "free-space" SDF loss that penalizes negative and large predicted SDF values. In some embodiments, the geometry training engine 132 computes free-space SDF losses using equation (7):

$$\text{if } |b(x_j)| > \tau \; L_{sdf} = \max(0, e^{-\varepsilon s(x_{p,q})} - 1, s(x_{p,q}) - b(x_{p,q})) \quad (7)$$

In equation (7), ε denotes a penalty factor,

The Eikonal regularization term discourages artifacts and invalid predictions and encourages valid SDF values. In some embodiments, the geometry training engine 132 computes the Eikonal regularization term using equation (8):

$$L_{eik} = \|\nabla_{x_{p,q}} S(x_{p,q}) - 1\|_2^2 \quad (8)$$

In equation (8) and below, $\nabla_{x_{p,q}}$ denotes a gradient of the predicted SDF value $s(x_{p,q})$ with respect to $x_{p,q}$.

To complete the iteration, the geometry training engine 132 updates the values of any number of the learnable parameters of the geometry decoder 144 and the geometry encoder 142 based on a goal of reducing the geometric reconstruction loss. In some embodiments, the geometry training engine 132 executes any type of backpropagation algorithm (not shown) on the rendering engine 134, the geometry decoder 144, and the geometry encoder 142. The backpropagation algorithm computes the gradient of the geometry loss function (e.g., equation 3) with respect to each of the learnable parameters of the geometry decoder 144 and the geometry encoder 142.

As shown, the geometry training engine 132 performs a parameter update 242 on geometry decoder 144 and a parameter update 244 on the geometry encoder 142 based on the computed gradients of the geometry loss function with respect to the learnable parameters of the geometry decoder 144 and the geometry encoder 142, respectively. The geometry training engine 132. replaces the values for any number of the learnable parameters included in the geometry decoder 144 with new values to perform the parameter update 242. The geometry training engine 132. replaces the values for any number of the learnable parameters included in the geometry encoder 142 with new values to perform the parameter update 244. Replacing the parameter values in this fashion increases the accuracy of scene reconstructions performed using the geometry encoder 142 and the geometry decoder 144.

The geometry training engine 132 can determine that the first training phase is complete based on any number and/or types of triggers. Some examples of triggers are executing a maximum number of epochs and determining that the geometry reconstruction loss is no greater than a maximum acceptable loss. After the geometry training engine 132 determines that the first training phase is complete, the training application 130 executes the second training phase.

At the start of the second training phase, the geometry encoder 142 and the geometry decoder 144 have already been trained based on a goal of reducing geometric reconstruction loss. Therefore, at the start of the second training phase, the geometry encoder 142, the geometry decoder 144 are also referred to herein as a pre-trained geometry encoder and a pre-trained geometry decoder, respectively. By contrast, at the start of the second training phase, the texture encoder 146 and the texture decoder 148 are also referred to herein as an untrained texture encoder and an untrained texture decoder, respectively.

During the second training phase, the geometry training engine 132 and the texture training engine 136 can collaborate to execute any number and/or types of unsupervised machine learning operations and/or machine learning algorithms on the geometry encoder 142, the geometry decoder 144, the texture encoder 146, and the texture decoder 148 over the training database 120. For explanatory purposes, the functionality of the training application 130, the geometry training engine 132, and the texture training engine 136 during the second phase are described herein in the context of executing a second iterative machine learning algorithm over the training database 120 for any number of epochs based on a mini-batch size of one. In some other embodiments, the geometry training engine 132 and the texture training engine 136 can execute the second exemplary iterative training process or any other type of iterative training process over any number of RGBD image data instances for any number of epochs based on any mini-batch size, and the techniques described below are modified accordingly.

During each mini-batch of the second training phase, the geometry training engine 132 can modify the values of the learnable parameters of the geometry encoder 142 and the geometry decoder 144 and the texture training engine 136 can modify the values of the learnable parameters of the texture encoder 146 and the texture decoder 148.

To initiate each iteration of an epoch during the second training phase, the training application 130 selects the least recently selected RGBD image data instance 122 from the training database 120. The training application 130 sets the current depth image 226, the current RGB image 224, and the current camera metadata 228 equal to the depth image, the RGB image, and the camera metadata, respectively, included in the selected RGBD image data instance 122.

The geometry training engine 132 determines key points 232, geometry feature vectors 234, query points 236, SDF values 238, and SDF gradients 246 based on the current depth image 226 and the current camera metadata 228 using the same process described previously herein in conjunction with the first training phase. As shown, the geometry training engine 132 transmits the key points 232, the geometry feature vectors 234, the query points 236, and the SDF gradients 246 to the texture training engine 136.

As shown, the texture training engine 136 includes pixel texture feature vectors 252, texture feature vectors 254, and radiance values 258. Note that the values of the pixel texture feature vectors 252, the texture feature vectors 254, and the radiance values 258 vary between each iteration of the second training phase. The texture training engine 136 can modify the parameter values of the texture encoder 146 and the texture decoder 148 during each mini-batch of the second training phase.

As shown, the texture training engine 136 executes the texture encoder 146 on the current RGB image 224 to generate pixel texture feature vectors 252. The pixel texture feature vectors 252 includes a different texture feature vector for each pixel included in the current RGB image 224. The texture encoder 146 can be any type of ML model that includes any number of learnable parameters. In some embodiments, the texture encoder 146 is a 2D convolution neural network that performs any number and/or types of image processing operations using any technically-feasible approach.

The texture training engine 136 projects the pixel texture feature vectors 252 onto the key points 232 in accordance with the projection locations of the key points 232 from the image plane to generate the texture feature vectors 254. The texture feature vectors 254 include a different texture feature vector for each of the key points 232. The key points 232 and the texture feature vectors 254 are a texture surface representation of the current RGB image 224. The key points 232, the texture feature vectors 254, and the geometry feature vectors 234 are a surface representation of the current RGBD image.

The texture training engine 136 generates a different texture input vector for each of the query points 236 based on the texture surface representation and the SDF gradients 246. As used herein, $f_{tex}(x_{p,q})$ denotes a texture feature vector associated with a query point $x_{p,q}$. More precisely, to compute a texture input vector for a query point, the texture training engine 136 selects K of the key points 232 that are closest to that query point. The texture training engine 136 applies distance-based spatial interpolation to compute a texture feature vector for that query point based on the textures feature vectors for the selected key points. In some embodiments, the texture training engine 136 computes a texture feature vector for each query point using equation (9) that is a modified version of equation (2a):

$$f_{tex}(x_{p,q}) = \Sigma_{v \in V} w_v f_{tex}(p_v) / \Sigma_{v \in V} w_v \qquad (9)$$

In equation (9), $f_{tex}(p_v)$ denotes a texture feature vector associated with key point $p_v$.

The texture training engine 136 computes a positional encoding for each of the query points 236. For each of the query points 236, the texture training engine 136 aggregates the associated encoded position, the associated texture feature, and the associated SDF value to generate an associated texture input vector.

The texture training engine 136 maps the texture input vectors to radiance values 258 using the texture decoder 148. The texture decoder 148 can be any type of machine learning model that includes, without limitation, any number and/or types of learnable parameters. In some embodiments, the texture decoder 148 is an MLP that predicts radiance values using any number and/or types of neural surface reconstruction techniques.

The radiance values 258 include a different predicted radiance value for each of the query points 236. Collectively, the query points 236 and the radiance values 258 are a texture 3D representation of the current RGB image 224, a texture 3D representation of the current RGBD image, and a texture 3D representation of at least a portion of a scene associated with the current RGBD image. Collectively, the query points 236, the SDF values 238, and the radiance values 258 are a 3D representation of the current RGBD image and a 3D representation of at least a portion of a scene associated with the current RGBD image.

The texture training engine 136 or the training application 130 configures the rendering engine 134 to generate a reconstructed RGBD image (not shown) based on the query points 236, the SDF values 238, the radiance values 258, and the current camera metadata 228. The reconstructed RGBD image includes a reconstructed RGB image and a reconstructed depth image. The rendering engine 134 can implement any number and/or types of volume rendering operations and/or volume rendering algorithms based, at least in part, on the SDF values 238 to generate the reconstructed RGBD image.

The training application 130 implements an RGBD loss function to compute a RGBD reconstruction loss based on the reconstructed RGBD image, the current RGBD image, and optionally the SDF values 238. In some embodiments, the training application 130 implements the RGBD loss function using equation (10):

$$L_{rgbd} = \lambda_{depth} L_{depth} + \lambda_{sdf} L_{sdf} + \lambda_{eik} L_{eik} + \lambda_{rgb} L_{rgb} \qquad (10)$$

In equation (10), $L_{rgbd}$ denotes an RGBD loss, $L_{depth}$ denotes a depth loss, $L_{sdf}$ denotes an approximated SDF loss, $L_{eik}$ denotes an Eikonal regularization term, $L_{rgb}$ denotes an RGB loss, and $\lambda_{depth}$, $\lambda_{sdf}$, $\lambda_{eik}$, and $\lambda_{rgb}$ denote hyperparameters. In some embodiments, the training application 130 computes $L_{depth}$, $L_{sdf}$, and $L_{eik}$ using equations (4)-(8) (as described above).

The RGB loss is a pixel-wise L2 rendering loss between the reconstructed RGB image denoted as $I_{rec}(x, y)$ and the current RGB image 224 denoted as $I(x, y)$. In some embodiments, the training application 130 computes the RGB loss using equation (11):

$$L_{rgb} = \|I_{rec}(x,y) - I(x,y)\|_2^2 \quad (11)$$

To complete the iteration, the texture training engine 136 and the geometry training engine 132 jointly update the values of any number of the learnable parameters of the texture decoder 148, the texture encoder 146, the geometry decoder 144, and the geometry encoder 142 based on a goal of reducing the RGBD reconstruction loss. The texture training engine 136 and the geometry training engine 132 can jointly update values of learnable parameters in any technically feasible fashion.

In some embodiments, the texture training engine 136 and the geometry training engine 132 collaborate to execute any number and/or types of backpropagation algorithms (not shown) on the rendering engine 134, the texture encoder 146, the texture decoder 148, the geometry encoder 142, and the geometry decoder 144. The backpropagation algorithm(s) compute the gradient of the RGBD loss function (e.g., equation (10)) with respect to each of the learnable parameters of the texture decoder 148, the texture encoder 146, the geometry decoder 144, and the geometry encoder 142.

As shown, the texture training engine 136 performs a parameter update 262 on the texture decoder 148 and a parameter update 264 on the texture encoder 146 based on the computed gradients of the RGBD loss function with respect to the learnable parameters of the texture decoder 148 and the texture encoder 146, respectively. The texture training engine 136 replaces the values for any number of the learnable parameters included in the texture decoder 148 with new values to perform the parameter update 262. The texture training engine 136 replaces the values for any number of the learnable parameters included in the texture encoder 146 with new values to perform the parameter update 264.

The geometry training engine 132 performs the parameter update 242 on the geometry decoder 144 and the parameter update 244 on the geometry encoder 142 based on the computed gradients of the RGBD loss function with respect to the learnable parameters of the geometry decoder 144 and the geometry encoder 142, respectively. The geometry training engine 132. replaces the values for any number of the learnable parameters included in the geometry decoder 144 with new values to perform the parameter update 242. The geometry training engine 132 replaces the values for any number of the learnable parameters included in the geometry encoder 142 with new values to perform the parameter update 244.

The geometry training engine 132 can determine that the second training phase is complete based on any number and/or types of triggers. Some examples of triggers are executing a maximum number of epochs and determining that the RGBD reconstruction loss is no greater than a maximum acceptable loss.

After determining that the second training phase is complete, the training application 130 sets the geometry encoder parameter values 152, the geometry decoder parameter values 154, the texture encoder parameter values 156, and the texture decoder parameter values 158 equal to the learned parameter values of the geometry encoder 142, the geometry decoder 144. the texture encoder 146, and the texture decoder 148, respectively.

The training application 130 then causes the geometry encoder parameter values 152, the geometry decoder parameter values 154, the texture encoder parameter values 156, and the texture decoder parameter values 158 to be integrated into an untrained version of the scene reconstruction model 160 to generate the scene reconstruction model 160 in any technically feasible fashion.

As persons skilled in the art will recognize, the techniques described herein are illustrative rather than restrictive and can be altered without departing from the broader spirit and scope of the invention. Many modifications and variations on the functionality of the training application 130, the geometry encoder 142, the geometry decoder 144, the texture encoder 146, the texture decoder 148, the geometry training engine 132, the rendering engine 134, and the texture training engine 136 as described herein will be apparent to those of ordinary skill in the art without departing from the scope and spirit of the described embodiments. For instance, in some embodiments, the rendering engine 134 is not executed during the first training phase, and the geometry training engine 132 and/or the geometry decoder 144 estimate depth values to generate each reconstructed depth image.

It will be appreciated that the training application 130 shown herein is illustrative and that variations and modifications are possible. For example, in some embodiments, any portions (including all) of the functionality provided by the training application 130, the geometry encoder 142, the geometry decoder 144, the texture encoder 146, the texture decoder 148, the geometry training engine 132, the rendering engine 134, and the texture training engine 136 can be integrated into or distributed across any number of machine learning models and/or any number of other software applications (including one). For instance in some embodiments, the training application 130 executes the texture encoder 146 on the current RGB image 224 and the key points 232 and, in response, the texture encoder 146 generates the texture feature vectors 254.

Figure 3A:
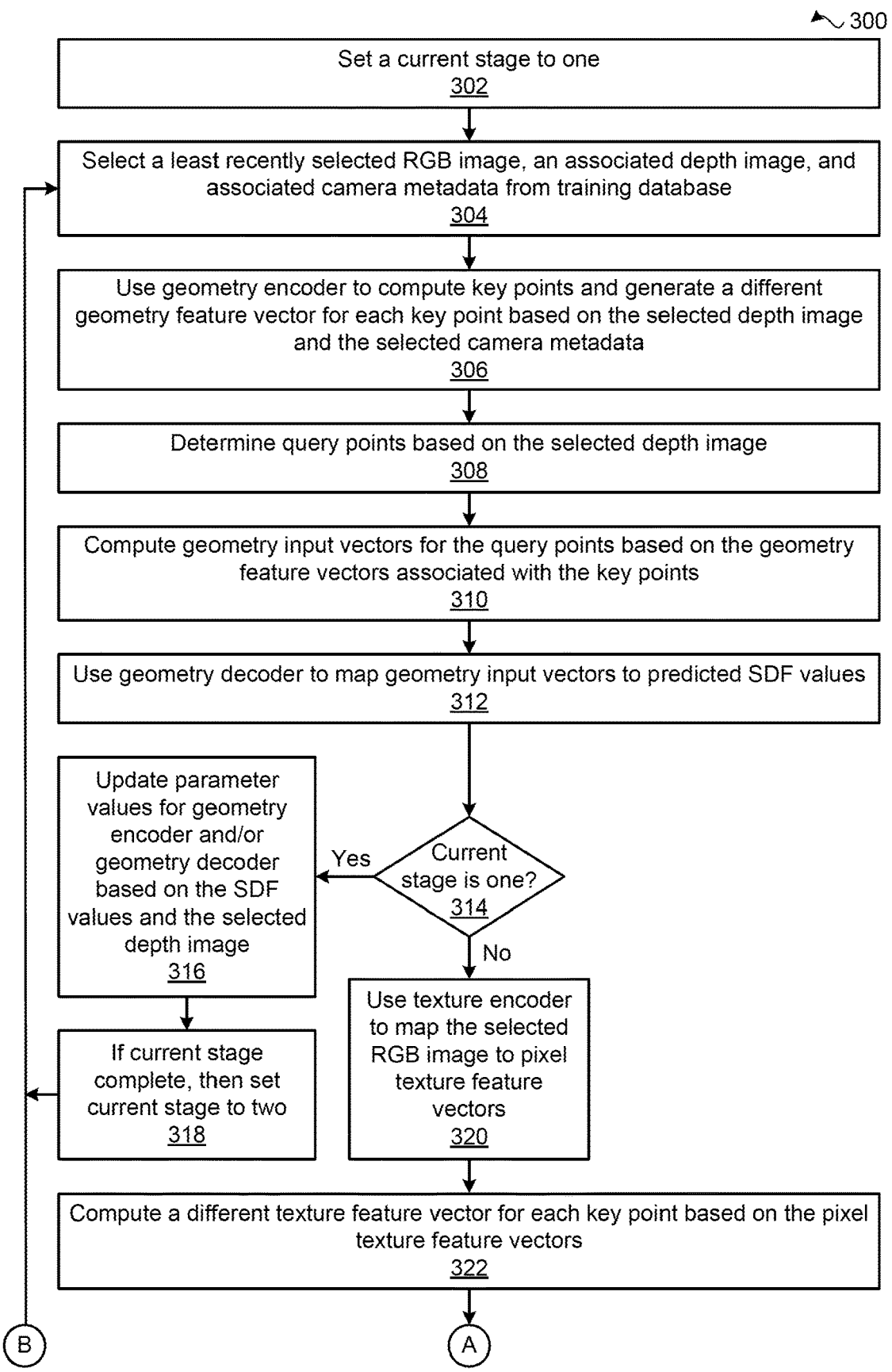
FIGS. 3A-3B sets forth a flow diagram of method steps for training a machine learning model to generate 3D representations of RGBD images, according to various embodiments.
Figure 3B:
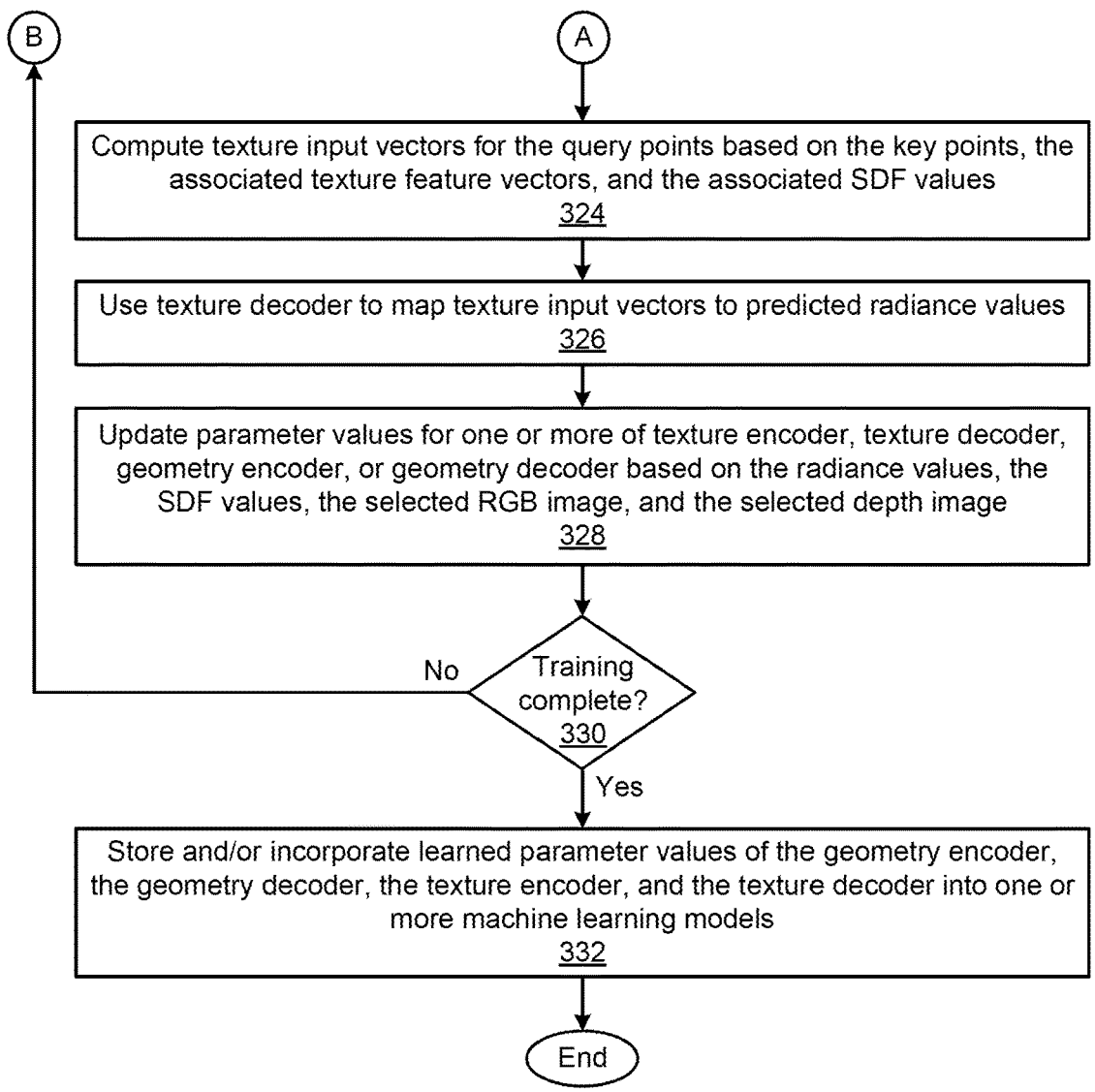

FIGS. 3A-3B sets forth a flow diagram of method steps for training a machine learning model to generate 3D representations of RGBD images, according to various embodiments. More specifically, FIGS. 3A-3B describe training a machine learning model to generate a 3D representation of any portion of any scene based on a single RGBD image and a viewpoint associated with the single RGBD image. Although the method steps are described with reference to the systems of FIGS. 1-2, persons skilled in the art will understand that any system configured to implement the method steps, in any order, falls within the scope of the present invention.

As shown, a method 300 begins at step 302, where the training application 130 sets a current stage to one. At step 304, the training application 130 selects a least recently selected RGB image, an associated depth image, and associated camera metadata from training database 120. At step 306, the geometry training engine 132 uses geometry encoder 142 to compute key points and generate a different geometry feature vector for each key point based on the selected depth image and the selected camera metadata.

At step 308, the geometry training engine 132 determines query points based on the selected depth image. At step 310, the geometry training engine 132 computes geometry input vectors for the query points based on the geometry feature vectors associated with the key points. At step 312, the geometry training engine 132 uses geometry decoder 144 to map the geometry input vectors to predicted SDF values.

At step 314, the training application 130 determines whether the current stage is one. If, at step 314, the training application 130 determines that the current stage is one, then the method 300 proceeds to step 316. At step 316, the geometry training engine 132 updates parameter values for geometry encoder 142 and/or geometry decoder 144 based on the predicted SDF values and the selected depth image. At step 318, if the geometry training engine 132 determines that the current stage is complete, then the geometry training engine 132 sets the current stage to two. The method 300 then returns to step 304, where the training application 130 selects a least recently selected RGB image, an associated depth image, and associated camera metadata from the training database 120.

If, however, at step 314, the training application 130 determines that the current stage is not one, then the method 300 proceeds directly to step 320. At step 320, the texture training engine 136 uses texture encoder 146 to map the selected RGB image to pixel texture feature vectors. At step 322, the texture training engine 136 computes a different texture feature vector for each key point based on the pixel texture feature vectors.

At step 324, the texture training engine 136 computes texture input vectors for the query points based on the key points, the associated texture feature vectors, and the associated predicted SDF values. At step 326, the texture training engine 136 uses texture decoder 148 to map the texture input vectors to predicted radiance values.

At step 328, the texture training engine 136 and the geometry training engine 132 update parameter values for one or more of texture encoder 146, texture decoder 148, geometry encoder 142, or geometry decoder 144 based on the predicted radiance values, the predicted SDF values, the selected RGB image, and the selected depth image.

At step 330, the training application 130 determines whether training is complete. If, at step 330, the training application 130 determines that training is not complete, then the method 300 returns to step 304, where the training application 130 selects a least recently selected RGB image, an associated depth image, and associated camera metadata from training database 120.

If, however, at step 330, the training application 130 determines that training is complete, then the method 300 proceeds to step 332. At step 332, the training application 130 stores and/or incorporates learned parameter values of geometry encoder 142, geometry decoder 144, texture encoder 146, and texture decoder 148 into one or more machine learning models. Incorporating learned parameter values of geometry encoder 142, geometry decoder 144, texture encoder 146, and texture decoder 148 into an untrained version of the scene reconstruction model 160 is also referred to herein as training the scene reconstruction model 160.

Figure 4:
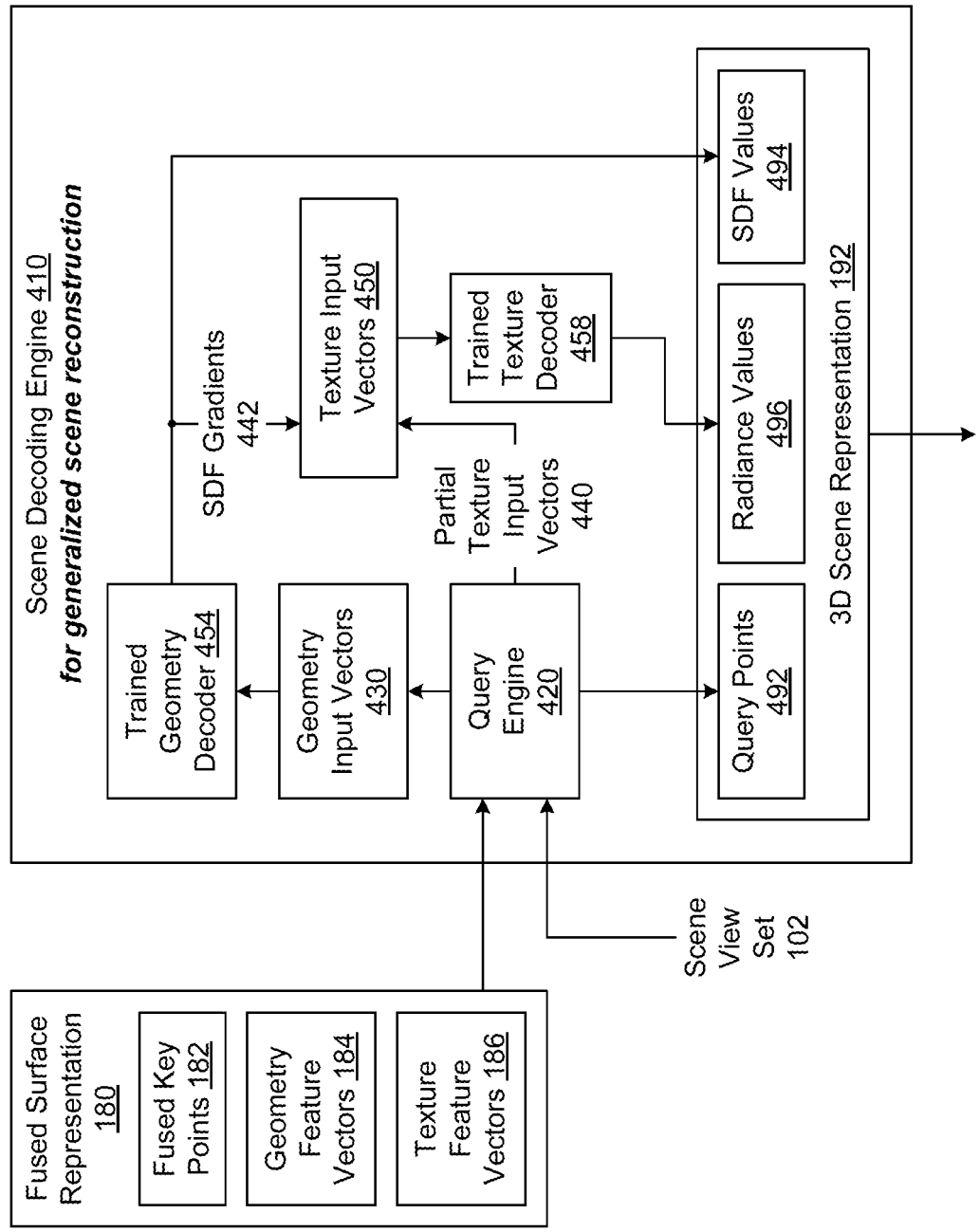
FIG. 4 is a more detailed illustration of the scene decoding engine of FIG. 1, according to various embodiments.

Generating 3D Representations of Different Scenes Using the Same Learned Parameter Values FIG. 4 is a more detailed illustration of the scene decoding engine 190 of FIG. 1, according to various embodiments. More specifically, in some embodiments (including embodiments depicted in and described in conjunction with FIG. 4), the scene decoding engine 190 included in the scene reconstruction model 160 of FIG. 1 is a scene decoding engine 410 that is used for generalized scene reconstruction.

As shown, the scene decoding engine 410 generates the 3D scene representation 192 based on the scene view set 102 and the fused surface representation 180. As described previously herein in conjunction with FIG. 1, the scene view set 102 specifies any number of RGBD images of any single scene captured from different viewpoints, the fused surface representation 180 is surface representation of that scene in a 3D space, and the 3D scene representation 192 is a 3D representation of that scene. As described previously herein in conjunction with FIG. 1, the fused surface representation 180 includes the fused key points 182, the geometry feature vectors 184, and the texture feature vectors 186.

As shown, the scene decoding engine 410 includes a trained geometry decoder 454, a trained texture decoder 458, a query engine 420, geometry input vectors 430, texture input vectors 450, and the 3D scene representation 192. The trained geometry decoder 454 is a version of the geometry decoder 144 of FIG. 2 having values of the learnable parameters that are equal to the geometry decoder parameter values 154 generated by the training application 130 of FIG. 2. The trained texture decoder 458 is a version of the texture decoder 148 of FIG. 2 having values of the learnable parameters that are equal to the texture decoder parameter values 158 generated by the training application 130 of FIG. 2.

As shown, the query engine 420 generates the query points 492, the geometry input vectors 430, and partial texture input vectors 440 based on the scene view set 102 and the fused surface representation 180. The query points 492 can include any number of 3D points. The query engine 420 determines the query points 492 based on the fused key points 182, the depth image 126(N+1)—the depth image 126(N+M) included in the scene view set 102, and the camera metadata 128(N+1)—the camera metadata 128(N+M) included in the scene view set 102.

For each pixel in each of the depth image 126(N+1)—the depth image 126(N+M), the query engine 420 generates a different back-projected ray and samples Q different points along the ray, where Q can be any positive integer. Referring back now to FIG. 2, in some embodiments, the query engine 420 applies equation (1) to each of the depth image 126(N+1)—the depth image 126(N+M) instead of the current depth image 226 to generate the query points 492.

The query engine 420 performs one or more interpolation operations on the fused surface representation 180 to generate the geometry input vectors 430 that include a different geometry input vector for each of the query points 492. More precisely, in some embodiments, the query engine 420 computes the geometry input vectors 430 that are associated with the query points 492 based on the fused key points 182 and the geometry feature vectors 184. The query engine 420 computes the geometric input vector for each of the query points 492 using the same process implemented by the geometry training engine 132 to compute the geometric input vector for each of the query points 236 that was described previously herein in conjunction with FIG. 2.

The partial texture input vectors 440 includes a different partial texture input vector for each of the query points 492. The partial texture input vector associated with a query point includes a positional encoding for the query point and a texture feature vector for the query point. The query engine 420 computes the texture feature vectors that are associated with the query points 492 based on the fused key points 182 and the texture feature vectors 186 using the same process implemented by the texture training engine 136 to compute the texture feature vectors 254 that was described previously herein in conjunction with FIG. 2.

As shown, the scene decoding engine 410 executes the trained geometry decoder 454 on the geometry input vectors 430 to generate SDF values 494. The SDF values 494 include a different predicted SDF value for each of the query points 492. The scene decoding engine 410 computes SDF gradients 442 based on the SDF values 494 and the query points 492. More specifically, for each query point included in the query points 492, the scene decoding engine 410 sets an associated SDF gradient equal to a gradient of the associated predicted SDF value with respect to the 3D position of the query point.

The scene decoding engine 410 aggregates the partial texture feature vector for each of the query points 492 with the corresponding SDF gradient to generate the texture input vectors 450. Accordingly, the texture input vectors 450 include a different texture input vector for each of the query points 492. As shown, the scene decoding engine 410 executes the trained texture decoder 458 on the texture input vectors 450 to generate radiance values 496.

As shown, the scene decoding engine 410 generates the 3D scene representation 192 that includes the query points 492, the SDF values 494, and the radiance values 496. Each of the query points 492 in the 3D scene representation 192 is therefore associated with a different one of the SDF values 494 and a different one of the radiance values 496.

As persons skilled in the art will recognize, the techniques described herein are illustrative rather than restrictive and can be altered without departing from the broader spirit and scope of the invention. Many modifications and variations on the functionality of the trained geometry decoder 454, the trained texture decoder 458, the scene decoding engine 410, the trained geometry decoder 454, the trained texture decoder 458, and the query engine 420 as described herein will be apparent to those of ordinary skill in the art without departing from the scope and spirit of the described embodiments. It will be appreciated that the scene decoding engine 410 shown herein is illustrative and that variations and modifications are possible. For example, in some embodiments, any portions (including all) of the functionality provided by the trained geometry decoder 454, the trained texture decoder 458, the scene decoding engine 410, the trained geometry decoder 454, the trained texture decoder 458, the query engine 420, or any combination thereof can be integrated into or distributed across any number of machine learning models and/or any number of other software applications (including one).

Figure 5A:
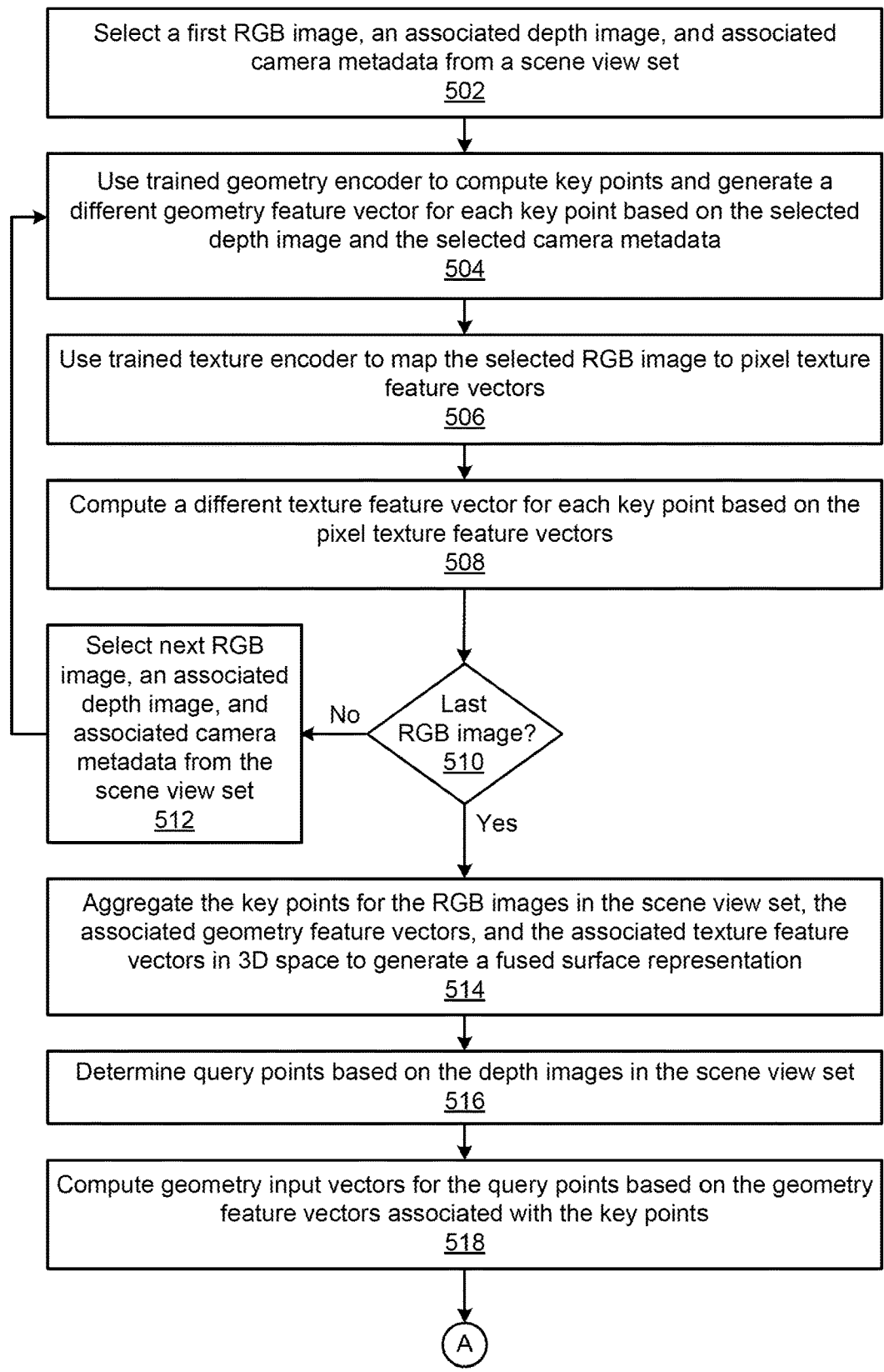
FIGS. 5A-5B sets forth a flow diagram of method steps for using a trained machine learning model to generate a 3D representation of a scene, according to various embodiments.
Figure 5B:
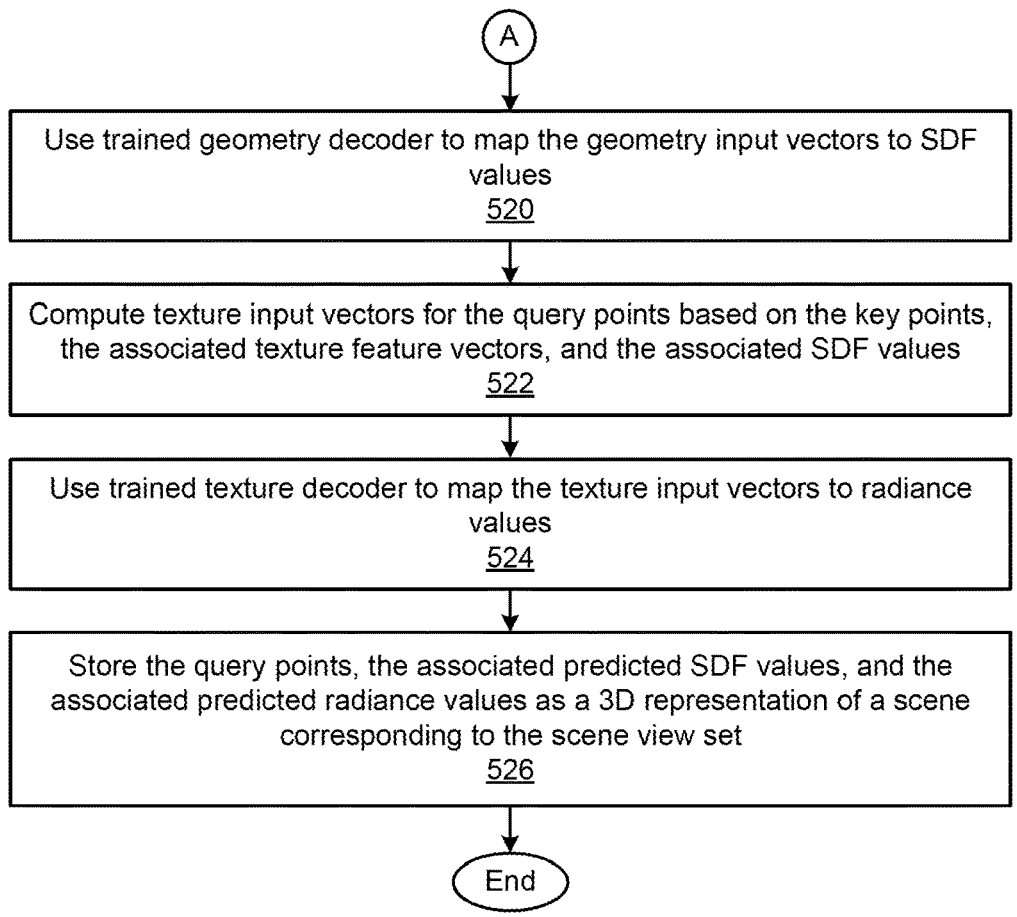

FIGS. 5A-5B sets forth a flow diagram of method steps for using a trained machine learning model to generate a 3D representation of a scene, according to various embodiments. Although the method steps are described with reference to the systems of FIGS. 1, 2, and 4, persons skilled in the art will understand that any system configured to implement the method steps, in any order, falls within the scope of the present invention.

As shown, a method 500 begins at step 502, where the scene reconstruction model 160 selects a first RGB image, an associated depth image, and associated camera metadata from a scene view set. At step 504, the scene reconstruction model 160 uses trained geometry encoder 172 to compute key points and generate a different geometry feature vector for each key point based on the selected depth image and the selected camera metadata.

At step 506, the scene reconstruction model 160 uses texture encoder 146 to map the selected RGB image to pixel texture feature vectors. At step 508, the scene reconstruction model 160 computes a different texture feature vector for each key point based on the pixel texture feature vectors.

At step 510, the scene reconstruction model 160 determines whether the selected RGB image is the last RGB image included in the scene view set. If, at step 510, the scene reconstruction model 160 determines that the selected RGB image is not the last RGB image included in the scene view set, then the method 500 proceeds to step 512.

At step 512, the scene reconstruction model 160 selects the next RGB image, an associated depth image, and associated camera metadata from the scene view set. The method 500 then returns to step 504, where the scene reconstruction model 160 uses trained geometry encoder 172 to compute key points and generate a different geometry feature vector for each key point based on the selected depth image and the selected camera metadata.

If, however, at step 510, the scene reconstruction model 160 determines that the selected RGB image is the last RGB image included in the scene view set, then the method 500 proceeds directly to step 514. At step 514, the scene reconstruction model 160 aggregates the key points for the RGB images in the scene view set, the associated geometry feature vectors, and the associated texture feature vectors in volumetric space to generate a fused surface representation At step 516, the scene decoding engine 410 determines query points based on the depth images in the scene view set. At step 518, the scene decoding engine 410 computes geometry input vectors for the query points based on the geometry feature vectors associated with the key points. At step 520, the scene decoding engine 410 uses trained geometry decoder 454 to map the geometry input vectors to predicted SDF values.

At step 522, the scene decoding engine 410 computes texture input vectors for the query points based on the key points, the associated texture feature vectors, and the associated predicted SDF values. At step 524, the scene decoding engine 410 uses trained texture decoder 458 to map the texture input vectors to predicted radiance values.

At step 526, the scene decoding engine 410 stores the query points, the associated predicted SDF values, and the associated predicted radiance values as a 3D representation of a scene corresponding to the scene view set. The method 500 then terminates.

Fine-Tuning a Scene Reconstruction Model

Figure 6:
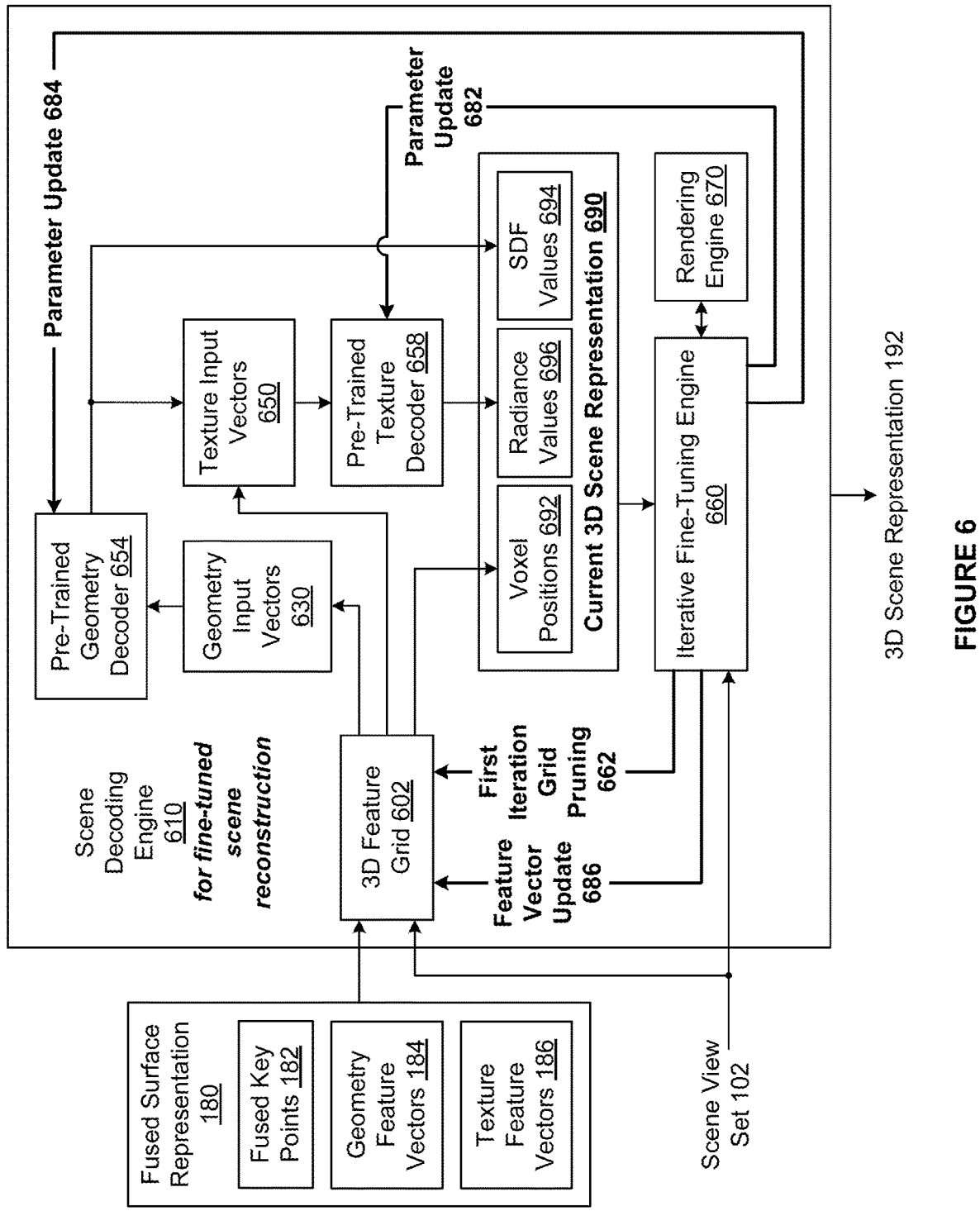
FIG. 6 is a more detailed illustration of the scene decoding engine of FIG. 1, according to other various embodiments.

FIG. 6 is a more detailed illustration of the scene decoding engine 190 of FIG. 1, according to other various embodiments. More specifically, in some embodiments (including embodiments depicted in and described in conjunction with FIG. 6), the scene decoding engine 190 included in the scene reconstruction model 160 of FIG. 1 is a scene decoding engine 610 that is fine-tuned per scene.

As shown, the scene decoding engine 610 generates the 3D scene representation 192 based on the scene view set 102 and the fused surface representation 180. As described previously herein in conjunction with FIG. 1, the scene view set 102 specifies any number of RGBD images of any single scene captured from different viewpoints, the fused surface representation 180 is surface representation of that scene in a 3D space, and the 3D scene representation 192 is a 3D representation of that scene.

As described previously herein in conjunction with FIG. 1, the scene view set 102 includes a set of RGBD images and different camera metadata for each of the RGBD images, where the camera metadata for each RGBD image specifies an associated viewpoint. The fused surface representation 180 includes the fused key points 182, the geometry feature vectors 184, and the texture feature vectors 186.

As shown, the scene decoding engine 610 includes a pre-trained geometry decoder 654, a pre-trained texture decoder 658, a 3D feature grid 602, geometry input vectors 630, texture input vectors 650, a current 3D scene representation 690, an iterative fine-tuning engine 660, and a rendering engine 670. The pre-trained geometry decoder 654 is a version of the geometry decoder 144 of FIG. 2 that initially has values of the learnable parameters that are equal to the geometry decoder parameter values 154 generated by the training application 130 of FIG. 2. The pre-trained texture decoder 658 is a version of the texture decoder 148 of FIG. 2 that initially has values of the learnable parameters that are equal to the texture decoder parameter values 158 generated by the training application 130 of FIG. 2.

As described in greater detail below, the 3D feature grid 602 is a learnable feature grid that includes any number of grid cells. Each grid cell includes a different voxel that is associated with both a geometry feature vector and a texture feature vector. Each voxel is a different 3D cube associated with a different 3D position. The 3D feature grid 602 therefore includes any number of voxels, where each voxel is associated with both a geometry feature vector and a texture feature vector.

The scene decoding engine 610 generates an initial version of the 3D feature grid 602 based on the scene view set 102 and the fused surface representation 180. More precisely, the scene decoding engine 610 initializes a uniform grid of voxels in 3D space. The scene decoding engine 610 performs one or more spatial interpolation operations on the fused surface representation 180 to generate a different geometry feature vector and a different texture feature vector for each voxel.

In some embodiments, the scene decoding engine 610 computes the geometry feature vectors that are associated with the voxels based on the geometry feature vectors 184 that are associated with the fused key points 182. The scene decoding engine 610 computes the geometry feature vector for each of the voxels using the same process implemented by the geometry training engine 132 to compute the geometry feature vector for each of the query points 236 that was described previously herein in conjunction with FIG. 2.

In the same or other embodiments, the scene decoding engine 610 computes the texture feature vectors that are associated with the voxels based on the texture feature vectors 186 that are associated with the fused key points 182. The scene decoding engine 610 computes the texture feature vector for each of the voxels using the same process implemented by the texture training engine 136 to compute the texture feature vector for each of the query points 236 that was described previously herein in conjunction with FIG. 2.

To generate the initial version of the 3D feature grid 602, the scene decoding engine 610 generates a different grid cell for each voxel. To generate a grid cell associated with a given voxel, the scene decoding engine 610 assigns the geometry feature vector associated with the given voxel and the texture feature vector associated with the given voxel to the given voxel. The scene decoding engine 610

After generating the initial version of the 3D feature grid 602, the scene decoding engine 610 executes an iterative fine-tuning process. During the iterative fine-tuning process, the scene decoding engine 610 can execute any number and/or types of pruning operations on the 3D feature grid 602 and any number and/or types of unsupervised machine learning operations on the 3D feature grid 602, the pre-trained geometry decoder 654, and the pre-trained texture decoder 658.

During each iteration of the iterative training process, the scene decoding engine 610 maps the 3D feature grid 602 to the current 3D scene representation 690. As shown, the current 3D scene representation 690 includes voxel positions 692, SDF values 694, and radiance values 696. Notably, the 3D feature grid 602 and/or the current 3D scene representation 690 associated with one iteration can different from the 3D feature grid 602 and/or the current 3D scene representation 690 associated with another iteration.

The voxel positions 692, the SDF values 694, and the radiance values 696 generated during each iteration include a different voxel position, a different predicted SDF value, and a different predicted radiance value, respectively, for each voxel included in the 3D feature grid 602 at the beginning of the same iteration. As shown, the scene decoding engine 610 sets the voxel positions 692 equal to the positions of the voxels included in the current version of the 3D feature grid 602.

The scene decoding engine 610 generates the geometry input vectors 630 based on the 3D feature grid 602. The geometry input vectors 630 include a different geometry input vector for each voxel included in the 3D feature grid 602. To generate the geometry input vectors 630, the scene decoding engine 610 computes positional encodings for the voxels included in the 3D feature grid 602. The scene decoding engine 610 then aggregates the positional encodings associated with the 3D feature grid 602 and the geometry feature vectors included in the 3D feature grid 602 in a voxel-wise fashion to generate the 3D geometry input vectors 630. The geometry input vectors 630 therefore include a different geometry input vector for each voxel included in the 3D feature grid 602. As shown, the scene decoding engine 610 executes the pre-trained geometry decoder 654 on the geometry input vectors 630 to generate the SDF values 694.

As shown, the scene decoding engine 610 generates the texture input vectors 650 based on the 3D feature grid 602 and the SDF values 694. The scene decoding engine 610 aggregates the positional encodings associated with the 3D feature grid 602, the texture feature vectors included in the 3D feature grid, and the gradients of the SDF values 694 with respect to the voxel positions 692 in a voxel-wise fashion to generate the texture input vectors 650. The texture input vectors 650 therefore include a different texture input vector for each voxel included in the 3D feature grid 602. As shown, the scene decoding engine 610 executes the pre-trained texture decoder 658 on the texture input vectors 650 to generate the radiance values 696.

As shown, during a first iteration of the iterative training process, the iterative fine-tuning engine 660 executes a first iteration grid pruning 662. To execute the first iteration grid pruning 662, the iterative fine-tuning engine 660 prunes (i.e., removes) zero or more voxels from the 3D feature grid 602 based on the SDF values 694 and a threshold SDF value. More specifically, the scene decoding engine 610 removes from the 3D feature grid 602 each voxel associated with a predicted SDF value that exceeds the threshold SDF value. As used herein, pruning or removing a voxel from the 3D feature grid 602 refers to removing the voxel, the geometry feature vector assigned to the voxel, and the texture feature vector assigned to the voxel from the 3D feature grid 602.

During each iteration (including the first iteration), the iterative fine-tuning engine 660 uses the rendering engine 670 to render reconstructed RGBD images based on the current 3D scene representation 690 and the viewpoints associated with RGBD images included in the scene view set 102. More precisely, the iterative fine-tuning engine 660 uses the rendering engine 670 to generate M different reconstructed RGBD images based on the current 3D scene representation 690 and the camera metadata 128(N+1)—the camera metadata 128(N+M). The rendering engine 670 can implement any number and/or types of volume rendering operations and/or volume rendering algorithms based, at least in part, on SDF values 694 to generate the reconstructed RGBD images.

The iterative fine-tuning engine 660 implements a scene loss function to compute a scene reconstruction loss based on the reconstructed RGBD images, the RGBD images included in the scene view set 102, and optionally the SDF values 694. In some embodiments, the iterative fine-tuning engine 660 implements the scene loss function using equation (12):

$$L_{scene} = \lambda_{depth} L_{depth} + \lambda_{sdf} L_{sdf} + \lambda_{eik} L_{eik} + \lambda_{rgb} L_{rgbd} + \lambda_{smooth} L_{smooth} \quad (12)$$

In equation (12) and below, $L_{scene}$ denotes a scene loss, $L_{smooth}$ denotes a smoothness regularization term, and $\lambda_{smooth}$ denotes a hyperparameter.

The smoothness regularization term reduces differences between the gradients of nearby query points. In some embodiments, the scene decoding engine 610 computes the smoothness regularization term using equation (13):

$$L_{smooth} = \|\nabla_{x_{p,q}} s(x_{p,q}) - \nabla_{x_{p,q}+\sigma} s(x_{p,q}+\sigma)\|_2 \quad (13)$$

In equation (13), σ denotes a relatively small perturbation value around $x_{p,q}$.

As described previously herein in conjunction with FIG. 2, $L_{depth}$ denotes a depth loss, $L_{sdf}$ denotes an approximated SDF loss, $L_{eik}$ denotes an Eikonal regularization term, $L_{rgb}$ denotes a pixel-wise RGB rendering loss, and $\lambda_{depth}$, $\lambda_{sdf}$, $\lambda_{eik}$, and $\lambda_{rgb}$ denote hyperparameters. In some embodiments, the iterative fine-tuning engine 660 computes $L_{depth}$, $L_{sdf}$, $L_{eik}$, and $L_{rgb}$ using modified versions of equations (4)-(10) (described previously herein in conjunction with FIG. 2).

To complete the iteration, the iterative fine-tuning engine 660 modifies at least one of the 3D feature grid 602, the pre-trained geometry decoder, or the pre-trained texture decoder based on a goal or reducing the scene reconstruction loss. The iterative fine-tuning engine 660 can modify values of geometry feature vectors, texture feature vectors, or learnable parameters in any technically feasible fashion.

In some embodiments, the iterative fine-tuning engine 660 execute any number and/or types of backpropagation algorithms (not shown) on the rendering engine 670, the pre-trained texture decoder 658, the pre-trained geometry decoder 654, and the 3D feature grid 602, The backpropagation algorithm(s) compute the gradient of the scene loss function (e.g., equation (12)) with respect to each of the learnable parameters of the pre-trained texture decoder 658, each of the learnable parameters of the pre-trained geometry decoder 654, each of the geometry feature vectors included in the 3D feature grid 602, and each of the texture feature vectors included in the 3D feature grid 602.

As shown, the iterative fine-tuning engine 660 performs at least one of a parameter update 682 on the pre-trained texture decoder 658, a parameter update 684 on the pre-trained geometry decoder 654, or a feature vector update 686 on the 3D feature grid 602 based on the associated gradients of the scene loss function. The iterative fine-tuning engine 660 replaces at least one value for a learnable parameter included in the pre-trained texture decoder 658 with a new value to perform the parameter update 682.

The iterative fine-tuning engine 660 replaces at least one value for a learnable parameter included in the pre-trained geometry decoder 654 with a new value to perform the parameter update 684. The iterative fine-tuning engine 660 replaces at least one value for a geometry feature vector or a texture feature vector included in the 3D feature grid 602 with a new value to perform the feature vector update 686, The scene decoding engine 610 can determine that fine-tuning is complete based on any number and/or types of triggers. Some examples of triggers are executing a maximum number of epochs and determining that the scene reconstruction loss is no greater than a maximum acceptable loss.

After determining that the fine-tuning is complete, the scene decoding engine 610 sets the 3D scene representation 192 equal to the most recently generated version of the current 3D scene representation 690. Accordingly, the 3D scene representation 192 of the target scene includes the voxel positions 692, the SDF values 694, and the radiance values 696. Each of the voxel positions 692 in the 3D scene representation 192 is therefore associated with a different one of the SDF values 694 and a different one of the radiance values 696.

As persons skilled in the art will recognize, the techniques described herein are illustrative rather than restrictive and can be altered without departing from the broader spirit and scope of the invention. Many modifications and variations on the functionality of the scene decoding engine 610, the pre-trained geometry decoder 654, the pre-trained texture decoder 658, the iterative fine-tuning engine 660, and the rendering engine 670 as described herein will be apparent to those of ordinary skill in the art without departing from the scope and spirit of the described embodiments.

For instance, in some embodiments, the iterative fine-tuning engine 660 can remove voxels from the 3D feature grid 602 during any number of iterations based on the SDF values 694 and an iteration-specific threshold SDF value. In the same or other embodiments, the iterative fine-tuning engine 660 gradually reduces the iteration-specific threshold SDF value.

It will be appreciated that the scene decoding engine 610 shown herein is illustrative and that variations and modifications are possible. For example, in some embodiments, any portions (including all) of the functionality provided by the scene decoding engine 610, the pre-trained geometry decoder 654, the pre-trained texture decoder 658, the iterative fine-tuning engine 660, the rendering engine 670, or any combination thereof can be integrated into or distributed across any number of machine learning models and/or any number of other software applications (including one).

Figure 7:
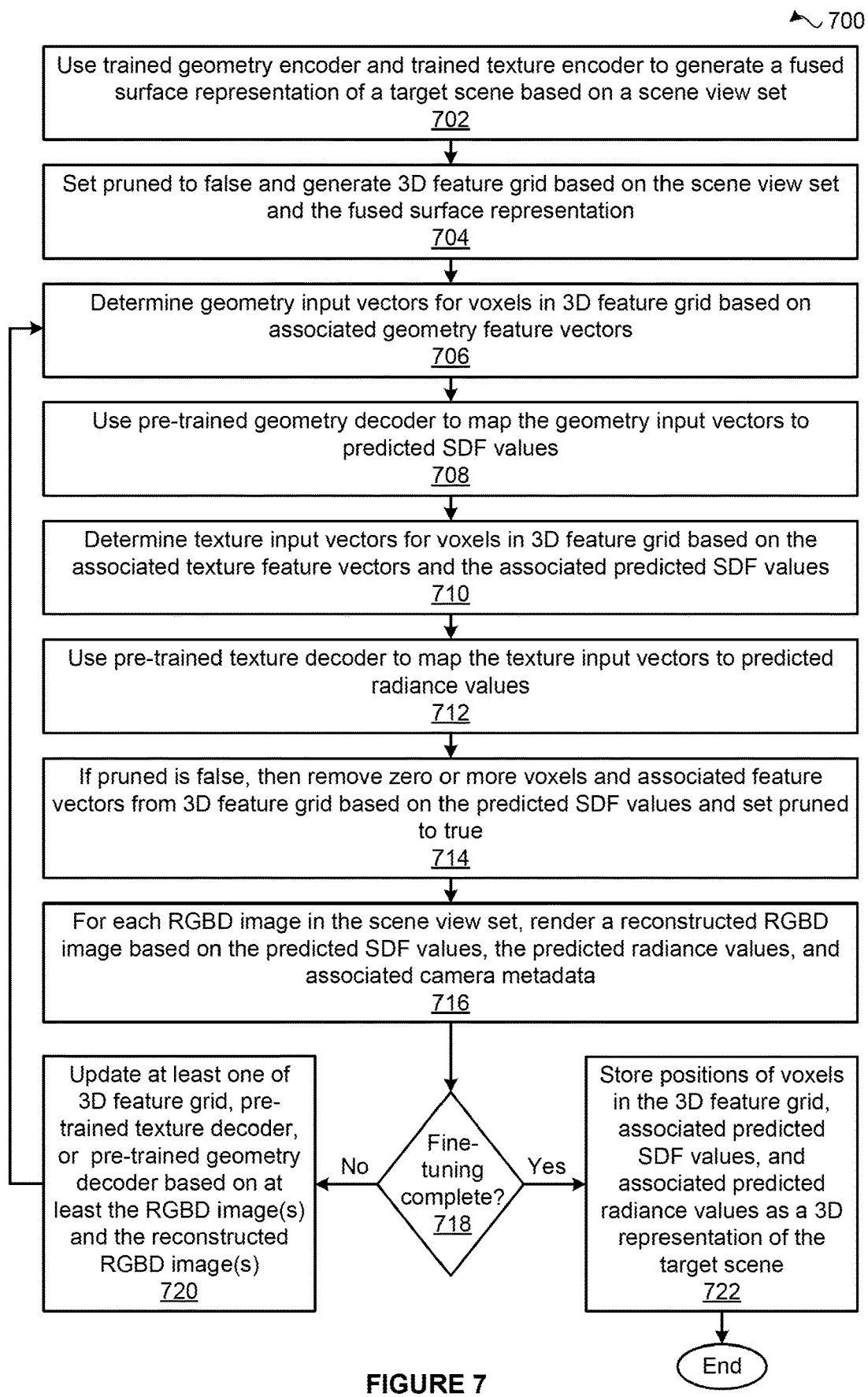
FIG. 7 is a flow diagram of method steps for fine-tuning a trained machine learning model to generate a 3D representation of a scene, according to other various embodiments.

FIG. 7 is a flow diagram of method steps for fine-tuning a trained machine learning model to generate a 3D representation of a scene, according to other various embodiments. Although the method steps are described with reference to the systems of FIGS. 1, 2, and 6, persons skilled in the art will understand that any system configured to implement the method steps, in any order, falls within the scope of the present invention.

As shown, a method 700 begins at step 702, where the scene reconstruction model 160 uses trained geometry encoder 172 and trained texture encoder 176 to generate a fused surface representation of a target scene based on a scene view set. The scene reconstruction model 160 can generate the fused surface representation in any technically feasible fashion. For instance, in some embodiments, the scene reconstruction model 160 executes steps 502-514 of method 500 to generate the fused surface representation.

At step 704, the scene decoding engine 610 sets pruned to false and generates 3D feature grid 602 based on the scene view set and the fused surface representation. At step 706, the scene decoding engine 610 determines geometry input vectors for voxels in 3D feature grid 602 based on the associated geometry feature vectors. At step 708, the scene decoding engine 610 uses pre-trained geometry decoder 654 to map the geometry input vectors to predicted SDF values.

At step 710, the scene decoding engine 610 determines texture input vectors for voxels in 3D feature grid 602 based on the associated texture feature vectors and the associated predicted SDF values. At step 712, the scene decoding engine 610 uses pre-trained texture decoder 658 to map the texture input vectors to predicted radiance values.

At step 714, if pruned is false, then the scene decoding engine 610 removes zero or more voxels and associated feature vectors from 3D feature grid 602 based on the predicted SDF values and sets pruned to true. At step 716, for each RGBD image in the scene view set, the scene decoding engine 610 renders a reconstructed RGBD image based on the predicted SDF values, the predicted radiance values, and associated camera metadata.

At step 718, the scene decoding engine 610 determines whether fine-tuning is complete. If, at step 718, the scene decoding engine 610 determines that fine-tuning is not complete, then the method 700 proceeds to step 720. At step 720, the scene decoding engine 610 updates at least one of 3D feature grid 602, pre-trained texture decoder 658, or pre-trained geometry decoder 654 based on at least the RGBD image(s) and the reconstructed RGBD image(s). The method 700 then returns to step 706, where the scene decoding engine 610 determines geometry input vectors for voxels in 3D feature grid 602 based on the associated geometry feature vectors.

If, however, at step 718, the scene decoding engine 610 determines that fine-tuning is complete, then the method 700 proceeds directly to step 722. At step 722, the scene decoding engine 610 stores positions of the voxels in the 3D feature grid 602, the associated predicted SDF values, and the associated predicted radiance values as a 3D representation of the target scene. The method 700 then terminates.

In sum, the disclosed techniques can be used to efficiently generate 3D representations of scenes. In some embodiments, a training application sequentially executes two different iterative training processes to generate a scene reconstruction model. In a first iterative training process, the training application jointly trains an untrained geometry encoder and an untrained geometry decoder over a training database of individual RGBD images and associated viewpoints based on a goal of reducing a geometric reconstruction loss. In a second iterative training process, the training application jointly trains the partially-trained geometry encoder, the partially trained geometry decoder, an untrained texture encoder, and an untrained texture decoder over the training database based on a goal of reducing an RGBD reconstruction loss. After completing the second iterative training process, the training application causes the learned parameters to be incorporated into an untrained version of a scene reconstruction model to generate a scene reconstruction model.

In some embodiments, the scene reconstruction model is configured to perform generalized scene reconstruction for any number of scenes using the same learned parameter values. In operation, the scene reconstruction model uses a trained geometry encoder and a trained texture encoder to independently map each of any number of RGBD images of a target scene and the associated viewpoint to a surface representation of the RGBD image. The scene reconstruction model aggregates the surface representations in a 3D space to generate a fused surface representation of the target scene. The surface reconstruction model uses a trained geometry decoder and a trained texture decoder to map the fused surface representation to a 3D representation of the target scene.

In some other embodiments, the scene reconstruction model is configured to iteratively fine-tune a 3D representation of the target scene. The scene reconstruction model uses a trained geometry encoder and a trained texture encoder to generate a fused surface representation of the target scene, The scene reconstruction model then generates a learnable 3D feature grid of voxels based on the fused surface representation of the target scene. The scene reconstruction model executes an iterative training process to modify values of geometry feature vectors and texture feature vectors included in the 3D feature grid and values of learnable parameters included in a pre-trained geometry decoder and a pre-trained texture decoder based on a goal of reducing a scene reconstruction loss. During each iteration, the scene reconstruction model generates a different 3D representation of the target scene. After the scene reconstruction model determines that the fine-tuning is complete, the scene reconstruction model stores and/or transmits to any number and/or types of software applications the most recently generated 3D representation of the target scene.

At least one technical advantage of the disclosed techniques relative to the prior art is that, with the disclosed techniques, a single trained neural network can be used to generate three-dimensional (3D) representations for multiple scenes. In that regard, with the disclosed techniques, a neural network is trained to generate a 3D representation of any portion of any scene based on a single RGBD image and a viewpoint associated with the single RGBD image. The resulting trained neural network can then be used to map a set of RGBD images for any given scene and viewpoints associated with those RGBD images to generate a 3D representation of that scene. Because only a single neural network is trained and only a single set of values for the learnable parameters is stored, the amount of processing resources and the amount of memory required to generate 3D representations for multiple scenes can be reduced relative to what can be achieved using prior art scene reconstruction techniques. These technical advantages provide one or more technological improvements over prior art approaches.

1. In some embodiments, a computer-implemented method for generating three-dimensional (3D) representations of scenes comprises computing a first 3D feature grid based on a set of red, blue, green, and depth (RGBD) images associated with a first scene; mapping the first 3D feature grid to a first 3D representation of the first scene; computing a first reconstruction loss based on the first 3D representation and the set of RGBD images; and modifying at least one of the first 3D feature grid, a first pre-trained geometry decoder, or a first pre-trained texture decoder based on the first reconstruction loss to generate a second 3D representation of the first scene.

2. The computer-implemented method of clause 1, wherein computing the first 3D feature grid comprises performing one or more spatial interpolation operations on a fused surface representation of the first scene.

3. The computer-implemented method of clauses 1 or 2, wherein computing the first 3D feature grid comprises assigning a first geometry feature vector and a first texture feature vector to a first voxel to generate a first grid cell.

4. The computer-implemented method of any of clauses 1-3, wherein mapping the first 3D feature grid comprises aggregating a plurality of positional encodings associated with the first 3D feature grid and a plurality of geometry feature vectors included in the first 3D feature grid to generate a plurality of input vectors; and executing the first pre-trained geometry decoder on the plurality of input vectors to generate a plurality of signed distance function values.

5. The computer-implemented method of any of clauses 1-4, wherein mapping the first 3D feature grid comprises generating a plurality of texture input vectors based on a plurality of texture feature vectors included in the first 3D feature grid and a plurality of signed distance function values generated by the first pre-trained geometry decoder; and executing the first pre-trained texture decoder on the plurality of texture input vectors to generate a plurality of radiance values.

6. The computer-implemented method of any of clauses 1-5, wherein computing the first reconstruction loss comprises rendering a first reconstructed RGBD image based on the first 3D representation and a first viewpoint associated with a first RGBD image included in the set of RGBD images.

7. The computer-implemented method of any of clauses 1-6, wherein computing the first reconstruction loss comprises computing at least one of a pixel-wise rendering loss or an approximated signed distance function loss.

8. The computer-implemented method of any of clauses 1-7, wherein modifying the at least one of the first 3D feature grid, the first trained geometry decoder, or the first trained texture decoder comprises replacing a first value for a first geometry feature vector included in the first 3D feature grid with a second value.

9. The computer-implemented method of any of clauses 1-8, wherein modifying the at least one of the first 3D feature grid, the first pre-trained geometry decoder, or the first pre-trained texture decoder comprises replacing a first value for a first learnable parameter included in the first pre-trained geometry decoder or the first pre-trained texture decoder with a second value.

10. The computer-implemented method of any of clauses 1-9, further comprising, prior to generating the second 3D representation, removing at least one of a first voxel, a first geometry feature vector associated with the first voxel, or a first texture feature vector associated with the first voxel from the first 3D feature grid based on a first signed distance function value associated with the first voxel.

11. In some embodiments, one or more non-transitory computer readable media include instructions that, when executed by one or more processors, cause the one or more processors to generate three-dimensional (3D) representations of scenes by performing the steps of computing a first 3D feature grid based on a set of red, blue, green, and depth (RGBD) images associated with a first scene; mapping the first 3D feature grid to a first 3D representation of the first scene; computing a first reconstruction loss based on the first 3D representation and the set of RGBD images; and modifying at least one of the first 3D feature grid, a first pre-trained geometry decoder, or a first pre-trained texture decoder based on the first reconstruction loss to generate a second 3D representation of the first scene.

12. The one or more non-transitory computer readable media of clause 11, wherein computing the first 3D feature grid comprises performing one or more spatial interpolation operations on a fused surface representation of the first scene.

13. The one or more non-transitory computer readable media of clauses 11 or 12, wherein computing the first 3D feature grid comprises assigning a first geometry feature vector and a first texture feature vector to a first voxel to generate a first grid cell.

14. The one or more non-transitory computer readable media of any of clauses 11-13, wherein mapping the first 3D feature grid comprises aggregating a plurality of positional encodings associated with the first 3D feature grid and a plurality of geometry feature vectors included in the first 3D feature grid to generate a plurality of input vectors; and executing the first pre-trained geometry decoder on the plurality of input vectors to generate a plurality of signed distance function values.

15. The one or more non-transitory computer readable media of any of clauses 11-14, wherein mapping the first 3D feature grid comprises generating a plurality of texture input vectors based on a plurality of texture feature vectors included in the first 3D feature grid and a plurality of signed distance function values generated by the first pre-trained geometry decoder; and executing the first pre-trained texture decoder on the plurality of texture input vectors to generate a plurality of radiance values.

16. The one or more non-transitory computer readable media of any of clauses 11-15, wherein computing the first reconstruction loss comprises rendering a first reconstructed RGBD image based on the first 3D representation and a first viewpoint associated with a first RGBD image included in the set of RGBD images.

17. The one or more non-transitory computer readable media of any of clauses 11-16, wherein the first viewpoint is specified by at least one of a rotation matrix, a 3D translation, or an intrinsic matrix associated with a camera.

18. The one or more non-transitory computer readable media of any of clauses 11-17, wherein modifying the at least one of the first 3D feature grid, the first trained geometry decoder, or the first trained texture decoder comprises replacing a first value for a first texture feature vector included in the first 3D feature grid with a second value.

19. The one or more non-transitory computer readable media of any of clauses 11-18, further comprising, prior to generating the second 3D representation, removing one or more voxels from the first 3D feature grid based on a plurality of signed distance function (SDF) values included in the first 3D representation and a threshold SDF value.

20. In some embodiments, a system comprises one or more memories storing instructions and one or more processors coupled to the one or more memories that, when executing the instructions, perform the steps of computing a first 3D feature grid based on a set of red, blue, green, and depth (RGBD) images associated with a first scene; mapping the first 3D feature grid to a first 3D representation of the first scene; computing a first reconstruction loss based on the first 3D representation and the set of RGBD images; and modifying at least one of the first 3D feature grid, a first pre-trained geometry decoder, or a first pre-trained texture decoder based on the first reconstruction loss to generate a second 3D representation of the first scene.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. Aspects of the present embodiments can be embodied as a system, method, or computer program product. Accordingly, aspects of the present disclosure can take the form of an entirely hardware embodiment, an entirely software embodiment (including firmware, resident software, and micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable media having computer readable program codec embodied thereon.

Any combination of one or more computer readable media can be utilized. Each computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for generating three-dimensional (3D) representations of scenes, the method comprising:
    computing a first 3D feature grid based on a set of red, blue, green, and depth (RGBD) images associated with a first scene;
    mapping the first 3D feature grid to a first 3D representation of the first scene;
    computing a first reconstruction loss based on the first 3D representation and the set of RGBD images; and
    modifying at least one of the first 3D feature grid, a first pre-trained geometry decoder, or a first pre-trained texture decoder based on the first reconstruction loss to generate a second 3D representation of the first scene.

2. The computer-implemented method of claim 1, wherein computing the first 3D feature grid comprises performing one or more spatial interpolation operations on a fused surface representation of the first scene.

3. The computer-implemented method of claim 1, wherein computing the first 3D feature grid comprises assigning a first geometry feature vector and a first texture feature vector to a first voxel to generate a first grid cell.

4. The computer-implemented method of claim 1, wherein mapping the first 3D feature grid comprises:
    aggregating a plurality of positional encodings associated with the first 3D feature grid and a plurality of geometry feature vectors included in the first 3D feature grid to generate a plurality of input vectors; and
    executing the first pre-trained geometry decoder on the plurality of input vectors to generate a plurality of signed distance function values.

5. The computer-implemented method of claim 1, wherein mapping the first 3D feature grid comprises:
    generating a plurality of texture input vectors based on a plurality of texture feature vectors included in the first 3D feature grid and a plurality of signed distance function values generated by the first pre-trained geometry decoder; and
    executing the first pre-trained texture decoder on the plurality of texture input vectors to generate a plurality of radiance values.

6. The computer-implemented method of claim 1, wherein computing the first reconstruction loss comprises rendering a first reconstructed RGBD image based on the first 3D representation and a first viewpoint associated with a first RGBD image included in the set of RGBD images.

7. The computer-implemented method of claim 1, wherein computing the first reconstruction loss comprises computing at least one of a pixel-wise rendering loss or an approximated signed distance function loss.

8. The computer-implemented method of claim 1, wherein modifying the at least one of the first 3D feature grid, the first trained geometry decoder, or the first trained texture decoder comprises replacing a first value for a first geometry feature vector included in the first 3D feature grid with a second value.

9. The computer-implemented method of claim 1, wherein modifying the at least one of the first 3D feature grid, the first pre-trained geometry decoder, or the first pre-trained texture decoder comprises replacing a first value for a first learnable parameter included in the first pre-trained geometry decoder or the first pre-trained texture decoder with a second value.

10. The computer-implemented method of claim 1, further comprising, prior to generating the second 3D representation, removing at least one of a first voxel, a first geometry feature vector associated with the first voxel, or a first texture feature vector associated with the first voxel from the first 3D feature grid based on a first signed distance function value associated with the first voxel.

11. One or more non-transitory computer readable media including instructions that, when executed by one or more processors, cause the one or more processors to generate three-dimensional (3D) representations of scenes by performing the steps of:
computing a first 3D feature grid based on a set of red, blue, green, and depth (RGBD) images associated with a first scene;
mapping the first 3D feature grid to a first 3D representation of the first scene;
computing a first reconstruction loss based on the first 3D representation and the set of RGBD images; and
modifying at least one of the first 3D feature grid, a first pre-trained geometry decoder, or a first pre-trained texture decoder based on the first reconstruction loss to generate a second 3D representation of the first scene.

12. The one or more non-transitory computer readable media of claim 11, wherein computing the first 3D feature grid comprises performing one or more spatial interpolation operations on a fused surface representation of the first scene.

13. The one or more non-transitory computer readable media of claim 11, wherein computing the first 3D feature grid comprises assigning a first geometry feature vector and a first texture feature vector to a first voxel to generate a first grid cell.

14. The one or more non-transitory computer readable media of claim 11, wherein mapping the first 3D feature grid comprises:
aggregating a plurality of positional encodings associated with the first 3D feature grid and a plurality of geometry feature vectors included in the first 3D feature grid to generate a plurality of input vectors; and
executing the first pre-trained geometry decoder on the plurality of input vectors to generate a plurality of signed distance function values.

15. The one or more non-transitory computer readable media of claim 11, wherein mapping the first 3D feature grid comprises:
generating a plurality of texture input vectors based on a plurality of texture feature vectors included in the first 3D feature grid and a plurality of signed distance function values generated by the first pre-trained geometry decoder; and
executing the first pre-trained texture decoder on the plurality of texture input vectors to generate a plurality of radiance values.

16. The one or more non-transitory computer readable media of claim 11, wherein computing the first reconstruction loss comprises rendering a first reconstructed RGBD image based on the first 3D representation and a first viewpoint associated with a first RGBD image included in the set of RGBD images.

17. The one or more non-transitory computer readable media of claim 16, wherein the first viewpoint is specified by at least one of a rotation matrix, a 3D translation, or an intrinsic matrix associated with a camera.

18. The one or more non-transitory computer readable media of claim 11, wherein modifying the at least one of the first 3D feature grid, the first trained geometry decoder, or the first trained texture decoder comprises replacing a first value for a first texture feature vector included in the first 3D feature grid with a second value.

19. The one or more non-transitory computer readable media of claim 11, further comprising, prior to generating the second 3D representation, removing one or more voxels from the first 3D feature grid based on a plurality of signed distance function (SDF) values included in the first 3D representation and a threshold SDF value.

20. A system comprising:
one or more memories storing instructions; and
one or more processors coupled to the one or more memories that, when executing the instructions, perform the steps of:
computing a first 3D feature grid based on a set of red, blue, green, and depth (RGBD) images associated with a first scene;
mapping the first 3D feature grid to a first 3D representation of the first scene;
computing a first reconstruction loss based on the first 3D representation and the set of RGBD images; and
modifying at least one of the first 3D feature grid, a first pre-trained geometry decoder, or a first pre-trained texture decoder based on the first reconstruction loss to generate a second 3D representation of the first scene.

* * * * *